United States Patent
Yamamoto

(10) Patent No.: US 8,495,339 B2
(45) Date of Patent: Jul. 23, 2013

(54) DYNAMIC RECONFIGURATION SUPPORT APPARATUS, DYNAMIC RECONFIGURATION SUPPORT METHOD, AND COMPUTER PRODUCT

(75) Inventor: Tatsuya Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 868 days.

(21) Appl. No.: 12/565,471

(22) Filed: Sep. 23, 2009

(65) Prior Publication Data

US 2010/0082943 A1 Apr. 1, 2010

(30) Foreign Application Priority Data

Sep. 26, 2008 (JP) ................................. 2008-249097

(51) Int. Cl.
*G06F 15/00* (2006.01)
(52) U.S. Cl.
USPC .......................................................... 712/15
(58) Field of Classification Search
None
See application file for complete search history.

(56) References Cited

U.S. PATENT DOCUMENTS

2003/0105617 A1 6/2003 Cadambi et al.
2008/0034235 A1 2/2008 Houshaku

FOREIGN PATENT DOCUMENTS

JP 2003-223476 A 8/2003
JP 2006-163815 A 6/2006

OTHER PUBLICATIONS

Banerjee et al., "PARLGRAN: Parallelism Granularity Selection for Scheduling Task Chains on Dynamically Reconfigurable Architectures", 2006, IEEE.*
Noguera et al., "System-Level Power-Performance Tradeoffs for Reconfigurable Computing", 2006, IEEE.*
Hirai, Keiichiro "Power Reduction of Dynamical Reconfigurable Processor MuCCRA", IEICE Technical Report RECONF 2007-11 May 2007, 61-66.
Nishimura, Takashi "Power analysis on Dynamic Reconfigurable Processor", IEICE Technical Report RECONF 2007-41 Nov. 2007, 31-36.

* cited by examiner

*Primary Examiner* — Andrew Caldwell
*Assistant Examiner* — Benjamin Geib
(74) *Attorney, Agent, or Firm* — Fujitsu Patent Center

(57) ABSTRACT

An apparatus controls a circuit having rewritable processor elements and includes an acquiring unit that acquires information concerning a first task under execution by the circuit; a reading unit that, when the information concerning the first task is acquired, reads from a memory, a completion time of the first task; a first calculating unit that calculates a deadline time using the read completion time; an identifying unit that refers to scheduling information in the memory and identifies for a second task, the quantity of processor elements to be rewritten by the deadline time; a second calculating unit that divides the identified quantity of the processor elements by the deadline time to calculate the quantity of processor elements to be rewritten per unit time; and an executing unit that causes the circuit to rewrite the processor elements for the second task, in the quantity per unit time calculated.

8 Claims, 25 Drawing Sheets

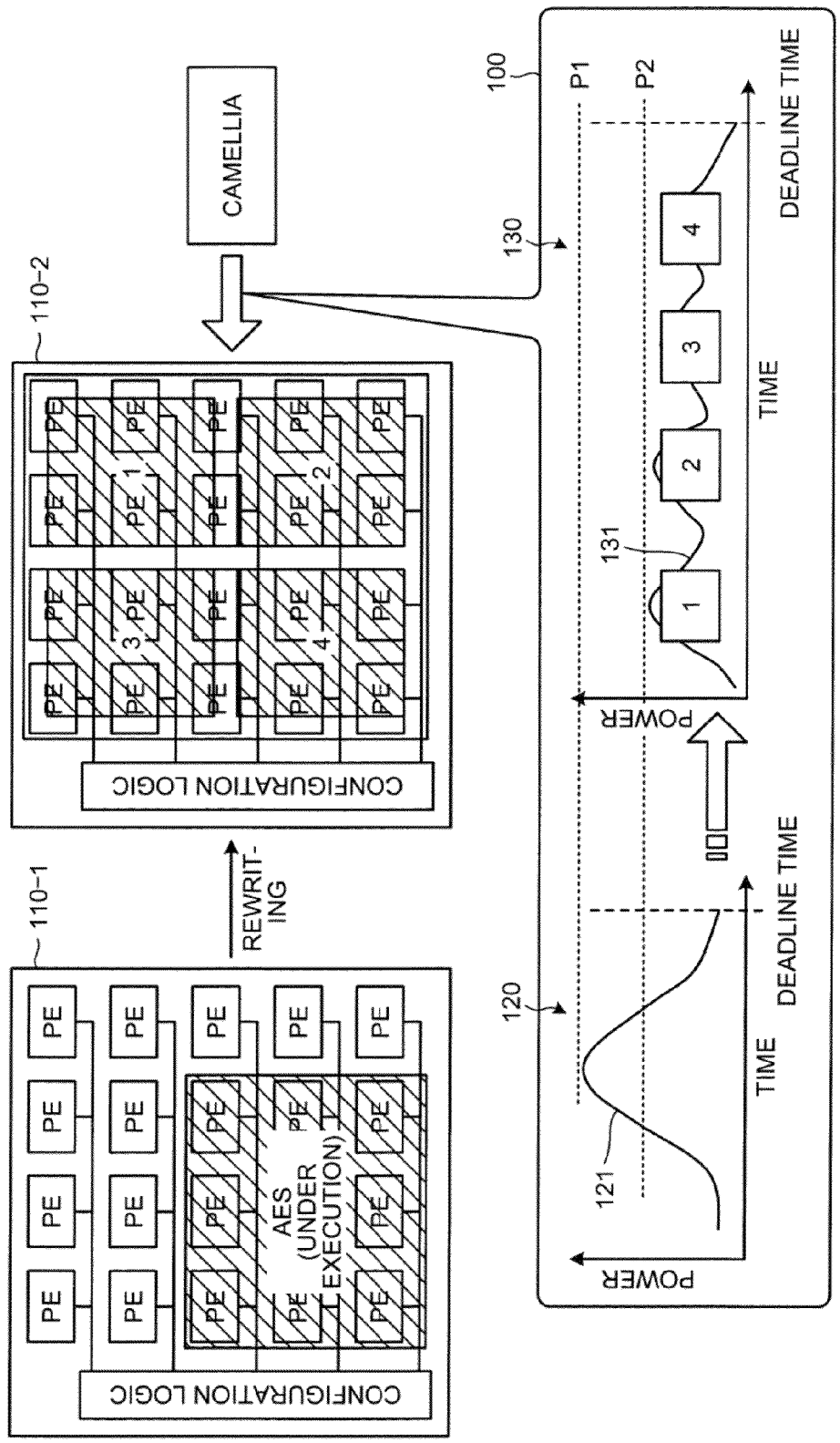

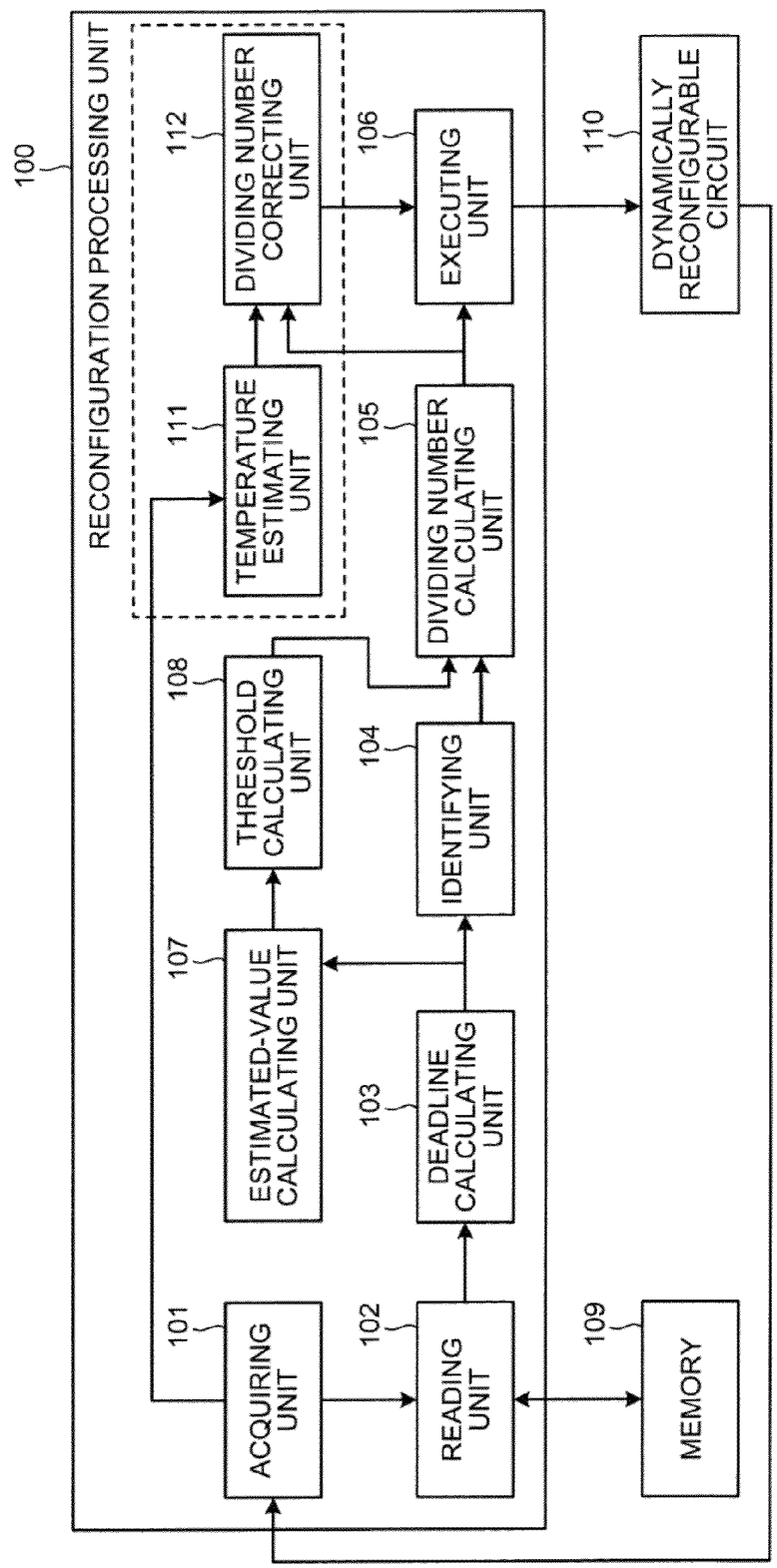

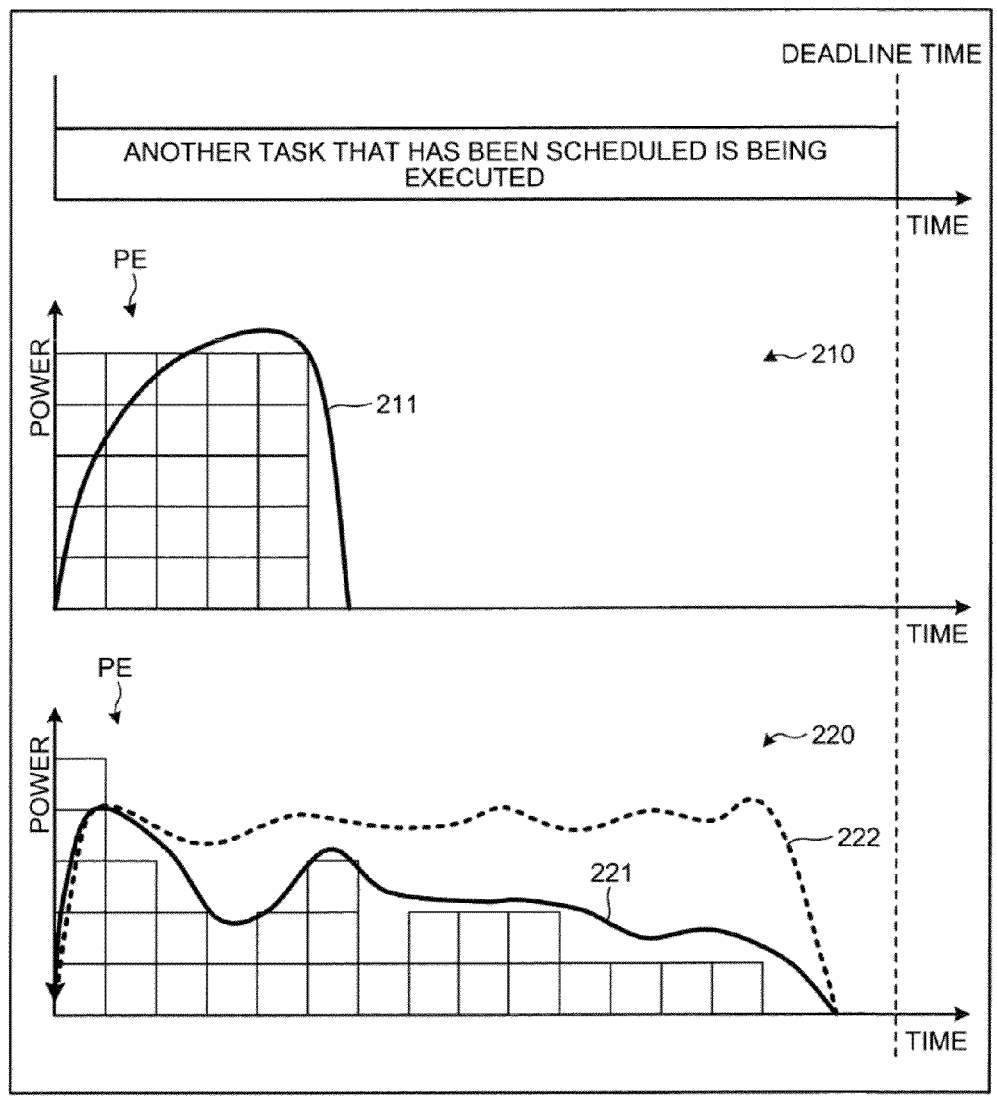

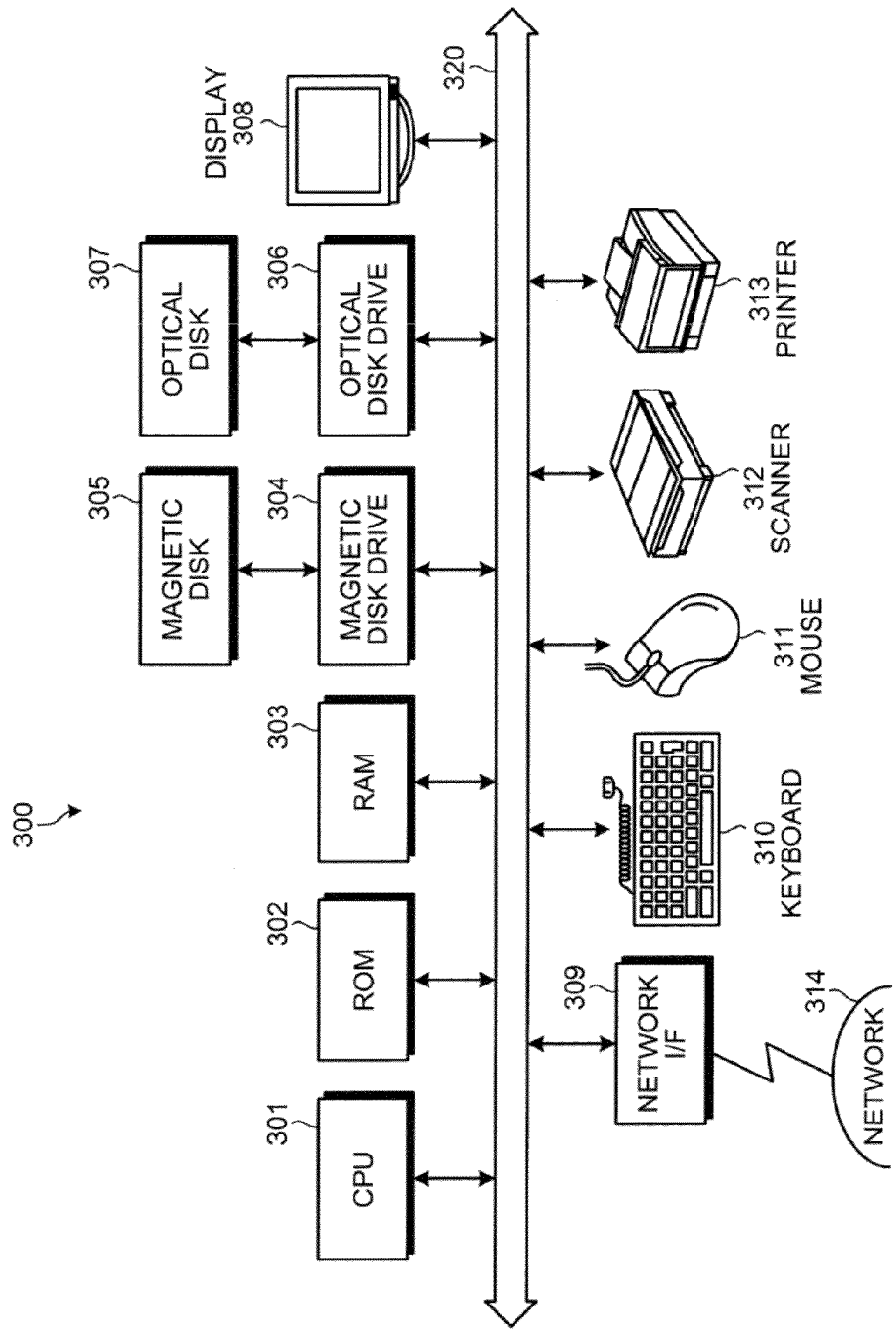

| NAME OF TASK | DEADLINE TIME |
|---|---|
| TASK A | 200 msec |
| TASK B | 280 msec |
| TASK C | 150 msec |

| t0 | 200 mW |
|---|---|
| t1 | 250 mW |
| t2 | 180 mW |
| t3 | 160 mW |

| BATTERY CAPACITY | 0.8 Ah |
|---|---|
| REMAINING BATTERY POWER | 0.2 Ah |
| DISCHARGE CURRENT VALUE | 1.0 A |

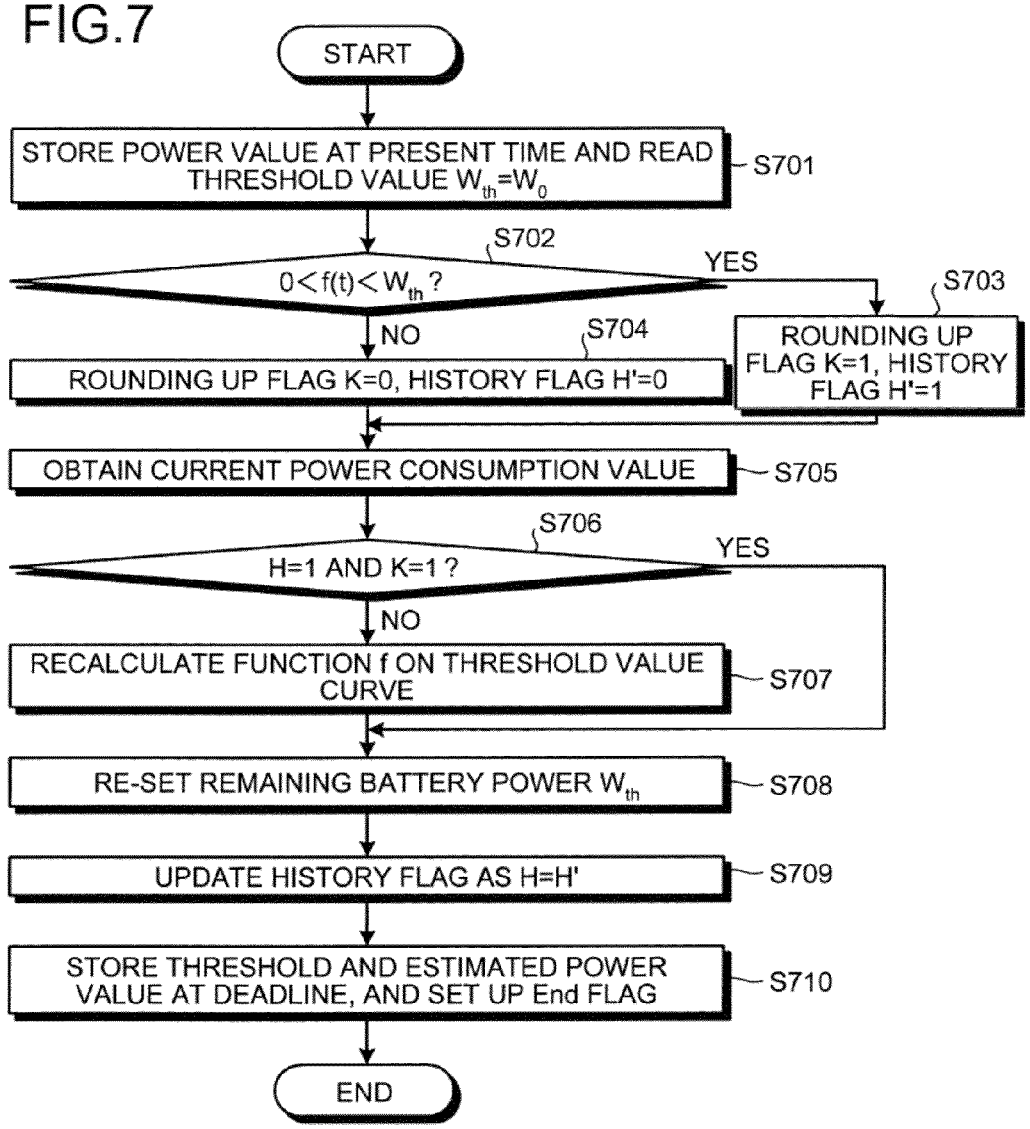

| End FLAG | 0/1 |
|---|---|
| ROUNDING UP FLAG K | 0/1 |
| HISTORY FLAG H | 0/1 |

| t0 | 200 |
|---|---|
| t1 | 250 |
| t2 | 180 |
| t3 | 160 |

| t | $W_t$ |
|---|---|
| t+1 | $W_{t+1}$ |

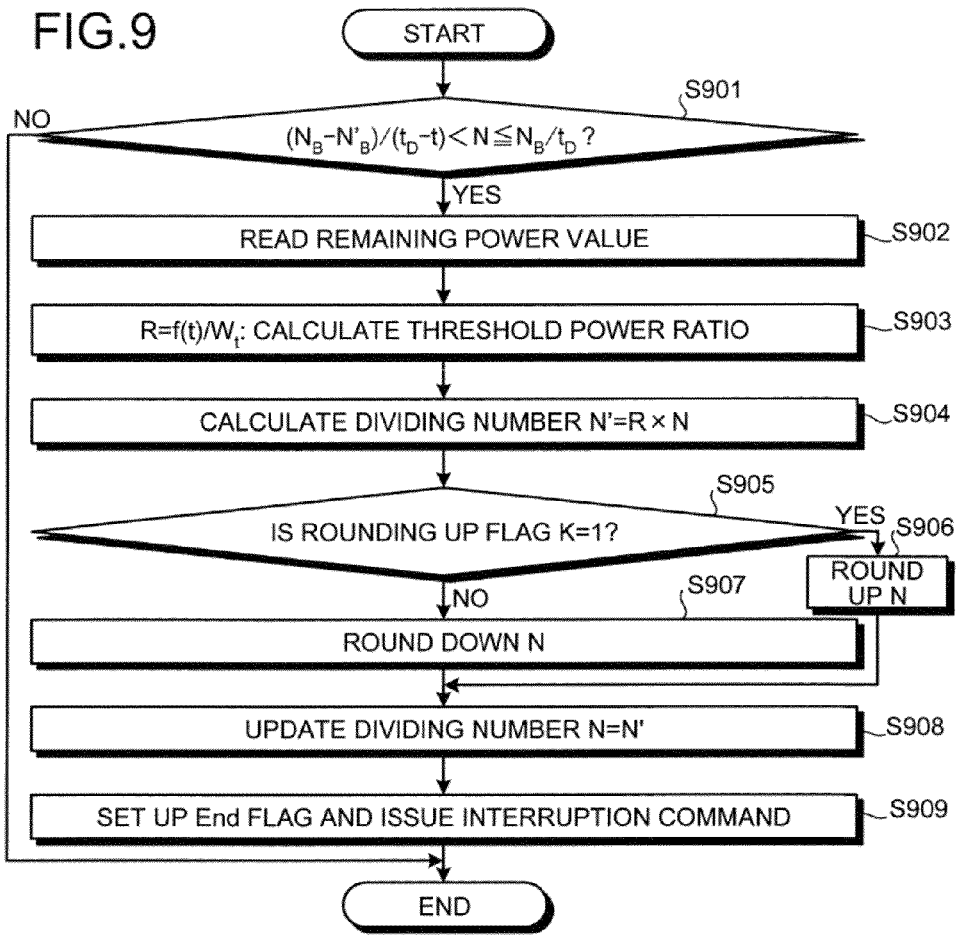
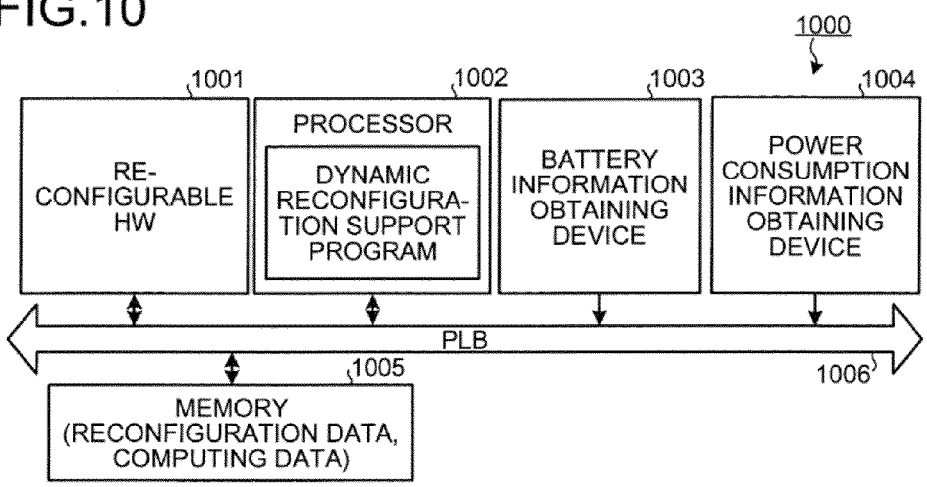

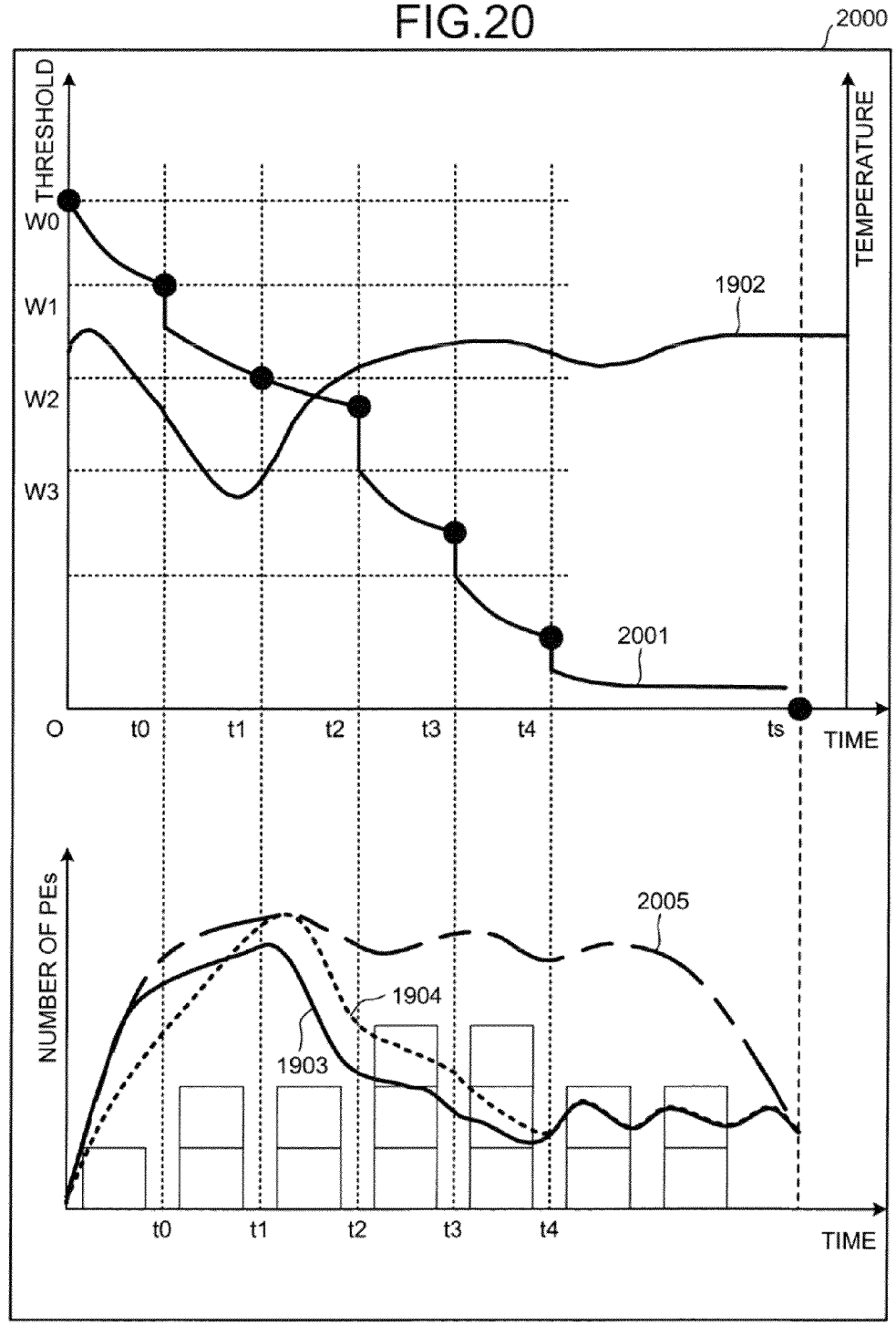

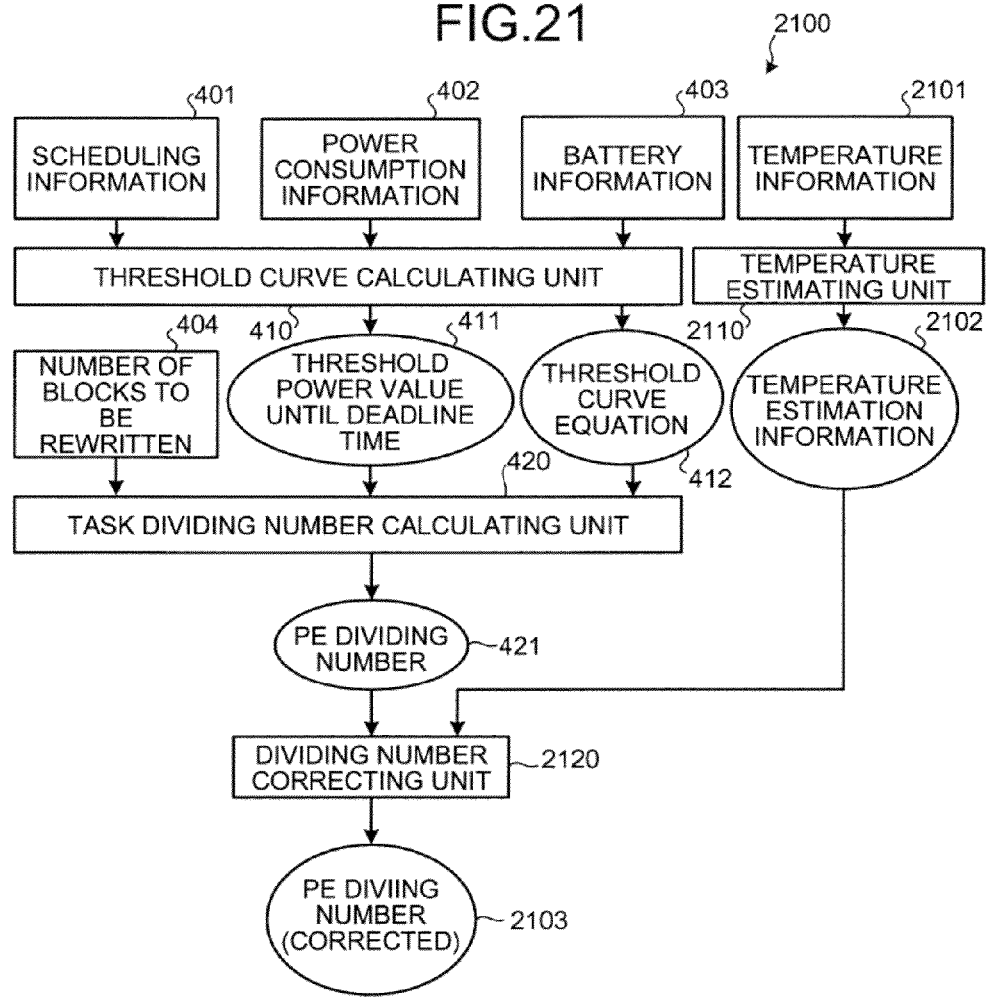

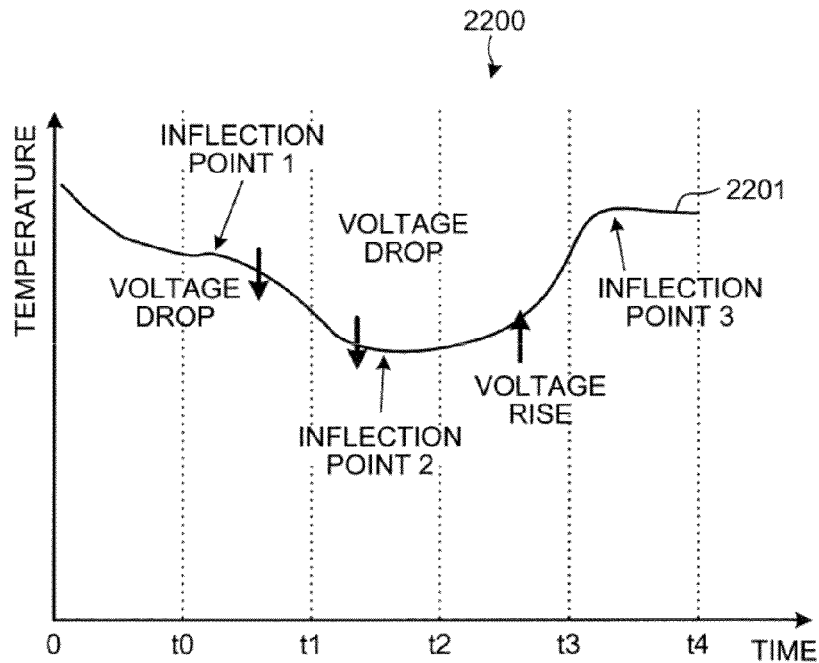
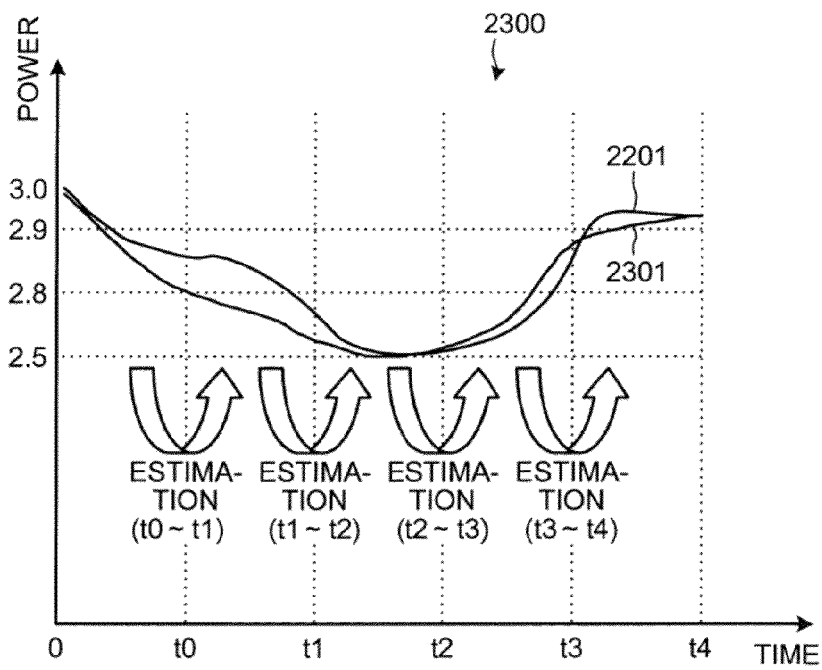

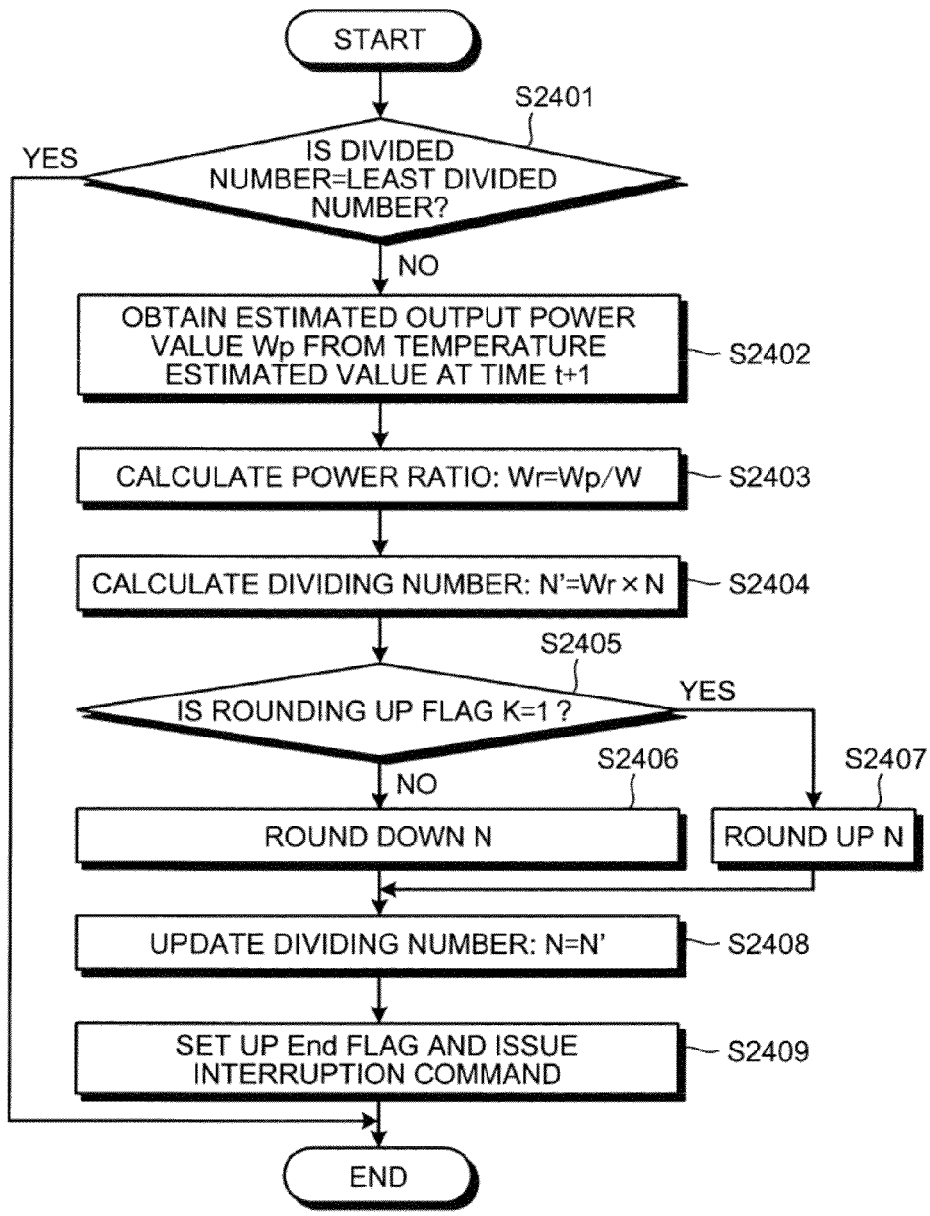

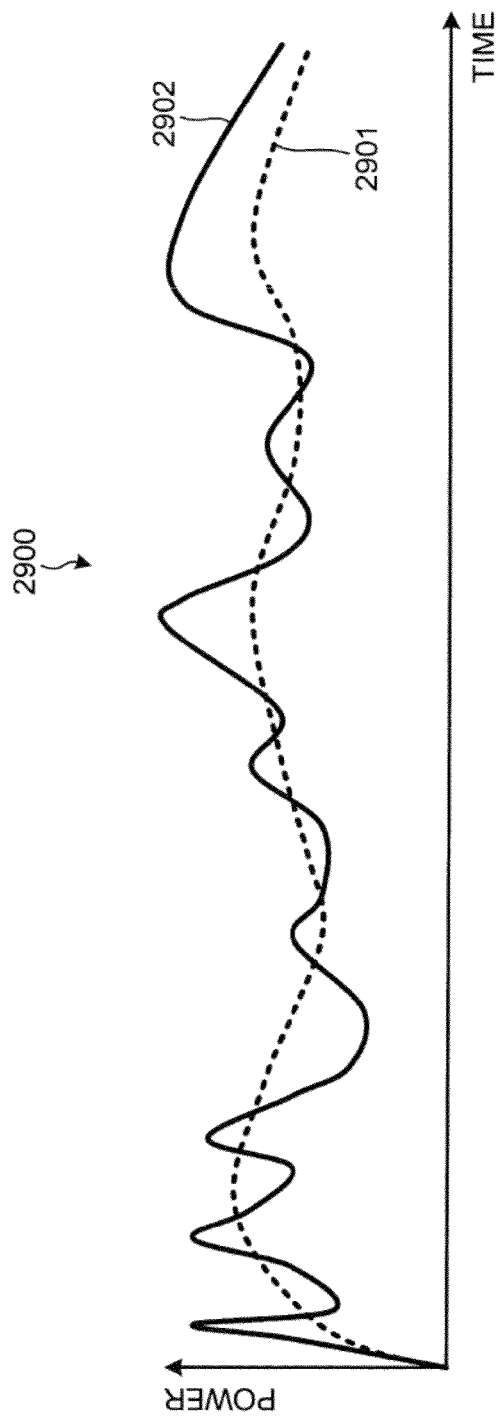

DYNAMIC RECONFIGURATION SUPPORT APPARATUS, DYNAMIC RECONFIGURATION SUPPORT METHOD, AND COMPUTER PRODUCT

CROSS REFERENCE TO RELATED APPLICATIONS

This application is based upon and claims the benefit of priority of the prior Japanese Patent Application No. 2008-249097, filed on Sep. 26, 2008, the entire contents of which are incorporated herein by reference.

FIELD

The embodiments discussed herein are related to dynamic reconfiguration and support thereof.

BACKGROUND

Recently, software or hardware may execute a designated task. Generally, software tends to consume more power in executing a task compared to hardware executing the same task. On the other hand, if the hardware is used to execute the task, though power consumption may be reduced, unlike software, hardware offers no flexibility, and dedicated hardware must be prepared. Therefore, to enjoy the advantage of executing the task using hardware without preparing any dedicated hardware, a highly-flexible dynamically reconfigurable circuit that can cope with a task when the circuit executes the task, is attracting more attention.

FIG. 26 is a diagram of a hardware rewriting process of a conventional dynamically reconfigurable circuit. As depicted in FIG. 26, to rewrite hardware in a dynamically reconfigurable circuit 2600-1, the entire logic 2601 (in this example, an encryption algorithm "advanced encryption standards" (AES)) having therein plural processor elements (PE)s to be rewritten, is mapped at one time. Thereafter, a necessary number of PEs to execute the logic 2601 of the PEs prepared in the dynamically reconfigurable circuit 2600-1 are rewritten and, thereby, the circuit 2600-1 is reconfigured dynamically into a dynamically reconfigurable circuit 2600-2 for executing the AES.

A long rewriting process time and high power consumption are required to rewrite, at one time, all the PEs that realize the logic 2601 as the dynamically reconfigurable circuit 2600-2 of FIG. 26. With the above time and power consumption, the advantage obtained in executing the task using the hardware, that is, a low power consumption is lost. A solution of executing partial rewriting has also been provided.

FIG. 27 is a diagram of a hardware rewriting process in plural dynamically reconfigurable circuits. In the example depicted in FIG. 27, dynamically reconfigurable circuits 2700-1 to 2700-4 sequentially execute tasks. For example, while the dynamically reconfigurable circuit 2700-1 is executing logic 2701 that realizes an encryption algorithm AES, rewriting processes of PEs are being executed in the other dynamically reconfigurable circuits 2700-2 to 2700-4 in the background to form logic that copes with tasks to be executed next and thereafter.

More specifically, mapping of logic 2702 that realizes an encryption algorithm "Camellia" is executed in the dynamically reconfigurable circuit 2700-2. Similarly, mapping of logic 2703 that realizes an encryption algorithm "TDEA" and mapping of logic 2704 that realizes an encryption algorithm "MISTY1" are respectively executed in the dynamically reconfigurable circuits 2700-3 and 2700-4. In this manner, a standby state due to the above rewriting processes may be suppressed by executing in parallel the rewriting processes of the dynamically reconfigurable circuits. Therefore, the rewriting process time that conventionally is the standby time for a user may be concealed superficially.

As described, a partial rewriting process is also effective for suppressing the rewriting process time period and the power consumed by the rewriting process. More specifically, logic to be rewritten (for example, the logic 2601 of FIG. 26) is divided and partially mapped. At this time, the order in which the rewriting processes are executed is statically fixed because the division of the logic is executed at the compiler level. To divide the logic at the compiler level as above, scheduling information concerning the tasks to be executed by each dynamically reconfigurable circuit needs to be obtained in advance. When the scheduling information is obtained in advance and the tasks are executed according to the schedule, the rewriting process is partially realized and consequently, the rewriting time period and the power consumption that are needed once are suppressed.

Refer to Japanese Laid-Open Patent Publication No. 2003-223476 and Japanese Laid-Open Patent Publication No. 2006-163815 as examples.

However, even when the above countermeasure is taken, high power consumption is still needed for the rewriting process of a PE associated with the reconfiguration of the dynamically reconfigurable circuit. Because the power consumption for executing the rewriting process is significantly high compared to that of an ordinary process, the load on the power supply is also high. Therefore, a problem has arisen in that, in a portable apparatus for which battery-operation is assumed, reconfiguration processing cannot be actively used even when a dynamically reconfigurable circuit is implemented on such an apparatus.

Even when a rewriting process of plural dynamically reconfigurable circuits is executed in the background as described, the effect of concealing the rewriting process time period is actually achieved. However, the problem of high power consumption remains because the rewriting process is executed for the dynamically reconfigurable circuits concurrently. Further, it has been experimentally demonstrated that the power consumption for reconfiguration processing becomes higher when more resources (in this case, the reconfigurable circuits) are used (see, e.g., Nishimura, Takashi, et al, "Power analysis on Dynamic Reconfigurable Processor", IEICE Tech. Rep., RECONF 2007-41 (2007-11), pp. 31-36).

FIG. 28 is a graph of power consumption for the hardware rewriting process. A graph 2800 depicts the variation of the power consumption when the rewriting process of the dynamically reconfigurable circuits 2700-2 to 2700-4 is executed in the background while the tasks are being executed in the dynamically reconfigurable circuit 2700-1 as described with reference to FIG. 27. On a curve 2801, the execution of the tasks in the dynamically reconfigurable circuit 2700-1 and the rewriting process in the dynamically reconfigurable circuits 2700-2 to 2700-4 concentrate at a time T1 and, therefore, high power is needed simultaneously. Therefore, a problem has arisen in that a significant voltage drop of the battery that drives the entire system occurs due to the power consumption by the operations at the time T1.

Even when the rewriting process is partially executed as described, the logic must be divided at the compiler level and processing to acquire data concerning power is necessary in advance. Therefore, a problem has arisen in that the partial rewriting process is applicable only to limited types of applications such as reproduction of stream data.

FIG. 29 is a graph of variations in power consumption for the partial rewriting process of hardware. In a graph 2900 of FIG. 29, a curve 2901 represents variations in the peak of power consumption estimated in advance. A curve 2902 represents variations in the peak of actual power consumption. Even in a case where variations in the peak of the power consumption is estimated in advance, when the process is actually executed, the power load varies due to the utilization environment and external factors (such as the power for processes in other phases) and the actual variation of the peak, the curve 2902, often significantly deviates from the estimated variation of the peak. When the peak power, the curve 2902, becomes higher than estimated, a gap occurs between the actual power and the power calculated at the scheduling and the fluctuation of the power displayed becomes significant. Consequently, the load on the battery becomes significant and a problem arises in that the life of the battery is reduced.

SUMMARY

According to an aspect of an embodiment, a computer-readable recording medium stores therein a dynamic-reconfiguration support program. The program causes a computer that controls a dynamically reconfigurable circuit having rewritable processor elements to execute acquiring information concerning a first task that is under execution by the dynamically reconfigurable circuit; reading an execution completion time of the first task, when the information concerning the first task is acquired at the acquiring, the execution completion time being read from a memory storing therein a sequence of tasks to be executed by the dynamically reconfigurable circuit, an execution completion time for each of the tasks, and scheduling information including a quantity of processor elements to be used for each of the tasks; calculating, using the execution completion time for the first task read at the reading, a deadline time that is a time after which a second task is started by the dynamically reconfigurable circuit; identifying, by referring to the quantity of processor elements to be used for each of the tasks included in the scheduling information, the quantity of the processor elements that are for the second task and are to be rewritten by the deadline time calculated at the calculating; calculating the quantity of the processor elements to be rewritten per unit time, by dividing, by the deadline time, the quantity of the processor elements identified at the identifying; and causing the dynamically configurable circuit to execute, in the quantity per unit time calculated at the calculating of the quantity, rewriting of the processor elements that are for the second task and are to be rewritten by the deadline time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A is a diagram of an overview of dynamic reconfiguration support processing according to an embodiment;

FIG. 1B is a block diagram of a functional configuration of a reconfiguration processing unit;

FIG. 2 is a diagram of exemplary mapping by the dynamic reconfiguration support processing;

FIG. 3 is a block diagram of a dynamic-reconfiguration support apparatus;

FIG. 7 is a flowchart of the process of calculating the threshold curve;

FIG. 8A is a diagram of setting criteria of the rounding up flag;

FIG. 8B is a diagram of flag values stored in a register;

FIG. 8C is a diagram of a power value for each time;

FIG. 8D is a diagram of an exemplary battery remaining amount;

FIG. 9 is a flowchart of a task dividing number calculating process;

FIG. 10 is a block diagram of exemplary configurations of a dynamically configurable circuit;

FIG. 20 is a diagram of the threshold curve and the dividing number after the correction using the temperature estimated curve;

FIG. 21 is a block diagram of a functional configuration of the dynamic reconfiguration support apparatus according to a second example;

FIG. 22 is a graph of exemplary creation of the temperature estimation curve;

FIG. 23 is a graph of exemplary creation of the temperature estimation curve;

FIG. 24 is a flowchart of a dividing number correcting process;

FIG. 29 is a graph of variations in power consumption for a partial rewriting process of hardware.

DESCRIPTION OF EMBODIMENTS

Figures 4, 5A, 5B, 5C:
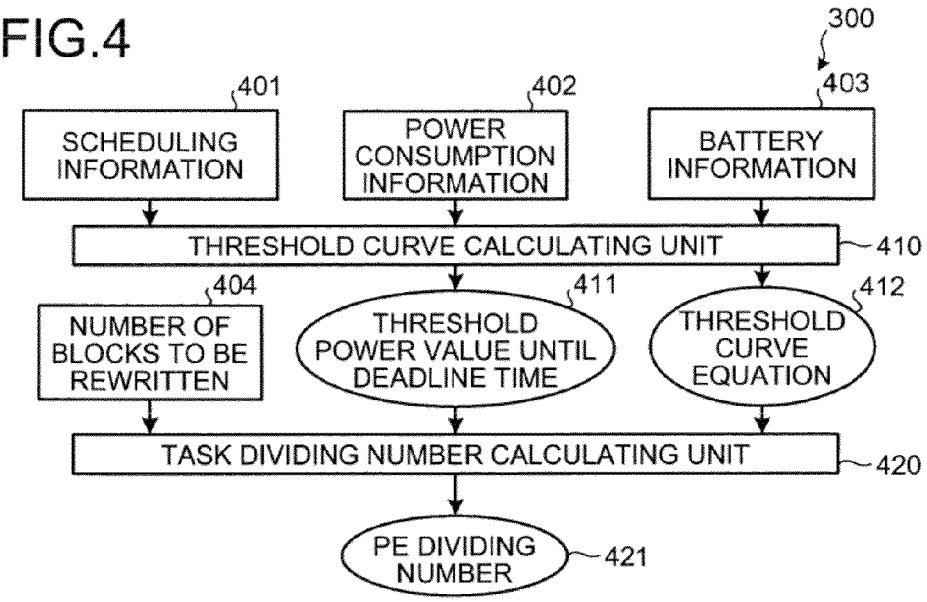
FIG. 4 is a block diagram of a functional configuration of the dynamic reconfiguration support apparatus according to a first example.
FIG. 5A is a diagram of exemplary scheduling information.
FIG. 5B is a diagram of exemplary power consumption information.
FIG. 5C is a diagram of exemplary battery information.

Preferred embodiments of the present invention will be explained with reference to the accompanying drawings.

According to the present embodiments, processing to rewrite PEs in a dynamically reconfigurable circuit is divided according to a deadline time, a time after which the next task starts. The processing to execute the rewriting at one time is distributed by sequentially executing, until the deadline time, the rewriting of PEs for a task. Based on the current remaining battery power when PEs are designated for a task and the power consumption, an adjustment may be executed such that variations in the peak of the power for the rewriting process of the PEs become more level.

FIG. 1A is a diagram of an overview of dynamic reconfiguration support processing according to an embodiment. A dynamically reconfigurable circuit 110-1 depicted in FIG. 1A represents a state where an encryption algorithm, "AES" logic, is executed as a task. When the task currently being executed is completed in the dynamically reconfigurable circuit 110-1, the PEs for implementing an encryption algorithm, "Camellia" logic, as the task to be executed next is to be rewritten to PEs in a dynamically reconfigurable circuit 110-2.

When the PEs to implement the Camellia logic are rewritten at one time by the deadline time using a conventional dynamic reconfiguration processing approach for such rewriting of the PEs, the power consumption locally becomes high as indicated by a curve 121 of a graph 120. Therefore, a reconfiguration processing unit 100 according to the embodiment divides all the PEs that are to be rewritten for the Camellia logic into four blocks 1 to 4 and controls the dynamically reconfigurable circuit 110-2 to sequentially execute the rewriting of the PEs corresponding to the blocks, respectively.

FIG. 1B is a block diagram of a functional configuration of the reconfiguration processing unit. The reconfiguration processing unit 100 is a functional unit that controls a dynamically reconfigurable circuit 110 and basically includes an acquiring unit 101, a reading unit 102, a deadline calculating unit 103, an identifying unit 104, a dividing number calculating unit 105, an executing unit 106, an estimated-value calculating unit 107, and a threshold calculating unit 108. The reconfiguration processing unit 100 is connected to a memory 109 that is always accessible. A temperature estimating unit 111 and a dividing number correcting unit 112 may be prepared as expandable functional units for the above. These functional units are used when the battery temperature of the dynamically reconfigurable circuit 110 is reflected on the dynamic reconfiguration support processing (the details thereof will be described later).

The acquiring unit 101 acquires information concerning a task being executed by the dynamically reconfigurable circuit 110. The reading unit 102 reads scheduling information from the memory 109 using, as a trigger, the acquisition of the information by the acquiring unit 101. The scheduling information is data including the sequence in which tasks are to be executed by the dynamically reconfigurable circuit 110, the execution completion time for each of the tasks, and the number of PEs used for each task, recorded in advance and respectively correlated.

The deadline calculating unit 103, using the execution completion time of the task being executed, calculates the deadline time, a time after which the next task is started by the dynamically reconfigurable circuit 110. The deadline time calculated by the deadline calculating unit 103 is stored in the memory 109 or an arbitrary storage area.

The identifying unit 104, by referring to the number of PEs used for each of the tasks indicated in the scheduling information, identifies the number of PEs to be rewritten by the deadline time calculated by the deadline calculating unit 103.

The dividing number calculating unit 105 calculates the number of PEs to be rewritten during each unit time by dividing the number of PEs identified by the identifying unit 104 by the deadline time. For example, when the deadline time is four [msec] and the number of identified PEs is 24 [PE], the number of PEs is divided by the deadline time. Therefore, in this case, six [PE] is calculated as the number of PEs to be rewritten during each unit time [msec]. The dividing number calculated by the dividing number calculating unit 105 is stored in the memory 109 or an arbitrary storage area.

The executing unit 106 causes the dynamically reconfigurable circuit 110 to execute the rewriting of the PEs for the next task by the deadline time, by rewriting the number of PEs per unit time calculated by the dividing number calculating unit 105. That is, while the dynamically reconfigurable circuit 110-1 is executing processing, the executing unit 106 controls the dynamically reconfigurable circuit 110-2 to rewrite the PEs of the dynamically reconfigurable circuit 110-2 that executes the next task. In the above exemplary division, the dynamically reconfigurable circuit 110-2 is controlled and thereby, is caused to execute a process of rewriting six PEs during each unit time until the deadline time.

The dynamically reconfigurable circuit 110-2 is rewritten by the deadline time to configure the PEs for the task to be executed next. At this time, the PEs to be rewritten are divided into four of blocks 1 to 4 and the rewriting process of the PEs in each block is sequentially executed for each unit time. Therefore, as indicated by a curve 131 in a graph 130 of FIG. 1A, variation of the power consumption is leveled. With a conventional technique, the peak of power consumption concerning the reconfiguration processing increases up to a value P1. However, with the reconfiguration processing unit 100 according to the embodiment, peak power consumption may be suppressed to a value P2. Consequently, the life of the battery may be extended because the load on the battery to drive the dynamically reconfigurable circuit 110 is reduced.

In the embodiment, in addition to the processing of simply dividing all the PEs to be rewritten based on the deadline time, by further acquiring information concerning the power consumption and the remaining battery power of the dynamically reconfigurable circuit 110, the reconfiguration processing with small variation of the power consumption may be realized (the number of PEs respectively included in the blocks 1 to 4 may differ in the dynamically reconfigurable circuit 110-2 depicted in FIG. 1A when this process is used).

For the process above, the reconfiguration processing unit 100 additionally includes an estimated-value calculating unit 107 and a threshold calculating unit 108. The estimated-value calculating unit 107 calculates an estimated value of the remaining power of the battery that drives the dynamically reconfigurable circuit 110. The threshold calculating unit 108 calculates a threshold value function that expresses the temporal variation of a threshold that is the consumable power for the dynamically reconfigurable circuit 110. For the above process, the above acquiring unit is caused to further acquire information concerning the remaining power of the battery and power consumption information of the dynamically reconfigurable circuit 110 from the dynamically reconfigurable circuit 110.

More specifically, the estimated-value calculating unit 107 calculates, with respect to the battery, an estimated value of the power remaining until the deadline time, using the remaining power information acquired by the acquiring unit 101 and the scheduling information read from the memory 109. The threshold calculating unit 108 calculates the threshold value function by substituting, at each predetermined time period, the power consumption information for the estimated value calculated by the estimated-value calculating unit 107.

When the threshold value function is calculated, the dividing number calculating unit 105 divides the PEs of the identified number into PEs of numbers rewritable using the power consumption equal to or less than the value of the threshold value function during each unit time. That is, when the estimated-value calculating unit 107 and the threshold calculating unit 108 are not used, all the PEs to be rewritten are simply evenly divided based on the deadline time. However, in the above case, the dividing number for dividing the number of the PEs is adjusted such that the rewriting of the PEs is completed with a power consumption less than the value of the threshold value function calculated at each predetermined time period.

FIG. 2 is a diagram of exemplary mapping by the dynamic reconfiguration support processing. As depicted in FIG. 2, the dynamically reconfigurable circuit 110 is to complete the rewriting of the 25 PEs by the deadline time. In a graph 210 in an upper portion of FIG. 2, a curve 211 indicates variation of the power consumption when the 25 PEs are conventionally rewritten at one time. On the other hand, in a graph 220 in a lower portion of FIG. 2, curves 221 and 222 indicate the power consumption when the reconfiguration processing unit 110 calculates the threshold value function, refers to this threshold value function, divides the number of PEs to be rewritten during each unit time, and executes the rewriting.

Therefore, compared to the division of the PEs of the graph 210, the number of the PEs at each time varies in the graph 220. In this case, the curve 221 indicates variation of the power consumption of a CPU that causes the dynamically reconfigurable circuit 110 to operate. Naturally, the power consumption of the CPU depends on the number of PEs that execute the rewriting process and therefore, the variation thereof indicates variation in proportion to the division of the PEs.

However, the power consumption of the system including the dynamically reconfigurable circuit 110 varies due to factors other than the processes of the CPU. The curve 222 of the graph 220 indicates variation of the power consumption of the entire system including the dynamically reconfigurable circuit 110 when the number of PEs rewritten during each unit time is divided and the rewriting is executed. The reconfiguration processing unit 100 acquires information concerning the actual power consumption; thereby, calculates the threshold value function, and divides the number of PEs according to the value. Therefore, being regarded as the power consumption value of the entire system, variation of the power consumption may be minimized as indicated by the curve 222.

Dynamic reconfiguration support processing may be realized that copes with a case where variation of the battery temperature is significant, by newly adding to the above basic configuration a function of acquiring, from the dynamically reconfigurable circuit 110, temperature information of the battery that drives the dynamically reconfigurable circuit system. Generally, the power consumption of a battery is significantly influenced by the temperature variation of the battery itself. Therefore, in a utilization environment that causes significant temperature variations of the battery or when a type of battery that has significant temperature variation is used, dynamic reconfiguration support processing that copes with the temperature variation may be realized by preparing these functional units.

The temperature estimating unit 111 calculates an estimated value of temperature variation of the battery that is mounted on the dynamically reconfigurable circuit 110. The dividing number correcting unit 112 corrects the number of PEs calculated by the dividing number calculating unit 105, using the estimated temperature variation value calculated by the temperature estimating unit 111.

More specifically, when the temperature estimating unit 111 and the dividing number correcting unit 112 are used, the acquiring unit 101 acquires temperature information for the battery of the dynamically reconfigurable circuit 110 and output power information that corresponds to the temperature information of the battery, in addition to executing the above processes. The temperature estimating unit 111 obtains the amount of variation at each predetermined time period with respect to the temperature information acquired by the acquiring unit 101, and calculates a temperature as an estimated value of the battery temperature for the next predetermined time period, by making the temperature indicated by the temperature information of the battery proportional to the amount of variation.

The dividing number correcting unit 112 corrects the number of PEs calculated by the dividing number calculating unit 105 based on the ratio of the power indicated by the output power information corresponding to the estimated value of the temperature calculated by the temperature estimating unit 111 and the value of the threshold value function. Exemplary correction by the dividing number correcting unit 112 may be, for example, that the number of PEs calculated by the dividing number calculating unit 105 is increased when the power output by the battery is determined to be high based on the ratio of the power output by the battery and the value of the threshold value function, and that the number of PEs calculated by the dividing number calculating unit 105 is decreased when the power output by the battery is determined to be low based on the ratio.

As described, with the dynamic reconfiguration support processing according to the embodiment, a local increase in power consumption may be suppressed by distributing the number of PEs to be rewritten during each unit time when reconfiguration is executed. The load on the battery may be reduced and the battery may be efficiently used because variation of the power consumption of the entire system is leveled by referring to the threshold value function.

For the dynamically configurable circuit 110, it is known that the power consumption becomes higher as the circuit area for which processes are concurrently executed becomes larger (Hirakawa, Keiichiro, et al, "Reduction of Power Consumption of a Dynamically Reconfigurable Processor MuCCRA", IEICE Tech. Rep., RECONF2007-41 (2007-11), pp. 61-66). In particular, for a dynamically reconfigurable circuit whose control portion has a small circuit area and whose circuit is mostly configured by a group of reconfigurable PEs, the processing area for changing PEs directly relates to the power consumption. Therefore, the number of PEs to be concurrently reconfigured is reduced by applying the dynamic reconfiguration support processing according to the embodiment. Consequently, the circuit area for which the processing is concurrently executed is reduced. As a result, an advantage that the power consumption for each unit time may be suppressed until the completion of the reconfiguration of the entire system is achieved.

Two examples where the reconfiguration processing unit 100 is implemented as a dynamic reconfiguration support apparatus will be described.

A first example is realizes the functions of the reconfiguration processing unit 100 described with reference to FIG. 1B as they are.

Here, a dynamic-reconfiguration support apparatus 300 is implemented using an all-purpose information processing apparatus. FIG. 3 is a block diagram of the dynamic-reconfiguration support apparatus. As depicted in FIG. 3, the dynamic-reconfiguration support apparatus 300 includes a central processing unit (CPU) 301, a read-only memory (ROM) 302, a random access memory (RAM) 303, a magnetic disk drive 304, a magnetic disk 305, an optical disk drive 306, an optical disk 307, a display 308, a communication interface (I/F) 309, a keyboard 310, a mouse 311, a scanner 312, and a printer 313, respectively connected by way of a bus 320.

With respect to FIG. 3, only a hardware configuration of the dynamic reconfiguration support apparatus 300 is independently described. However, the dynamic reconfiguration support apparatus 300 basically is an apparatus that controls the dynamically reconfigurable circuit and therefore, is actually connected to the dynamically reconfigurable circuit to be controlled through the bus 320. However, the circuit is omitted herein.

The CPU 301 governs overall control of the dynamic-reconfiguration support apparatus 300. The ROM 302 stores therein programs such as a boot program and a dynamic-reconfiguration support program. The RAM 303 is used as a work area of the CPU 301. The magnetic disk drive 304, under the control of the CPU 301, controls the reading and writing of data with respect to the magnetic disk 305. The magnetic disk 305 stores therein data written under control of the magnetic disk drive 304.

The optical disk drive 306, under the control of the CPU 301, controls the reading and writing of data with respect to the optical disk 307. The optical disk 307 stores therein data written under control of the optical disk drive 306, the data being read by a computer.

The display 308 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 308.

The communication I/F 309 is connected to a network 314 such as a local area network (LAN), a wide area network (WAN), and the Internet through a communication line and is connected to other apparatuses through the network 314. The communication I/F 309 administers an internal interface with the network 314 and controls the input/output of data from/to external apparatuses. For example, a modem or a LAN adaptor may be employed as the communication I/F 309.

The keyboard 310 includes, for example, keys for inputting letters, numerals, and various instructions and performs the input of data. Alternatively, a touch-panel-type input pad or numeric keypad, etc. may be adopted. The mouse 311 performs the movement of the cursor, selection of a region, or movement and size change of windows. A track ball or a joy stick may be adopted provided each respectively has a function similar to a pointing device.

The scanner 312 optically reads an image and takes in the image data into the IP model creating apparatus. The scanner 312 may have an optical character recognition (OCR) function as well. The printer 313 prints image data and text data. The printer 313 may be, for example, a laser printer or an ink jet printer.

The highest effect is achieved when the dynamic reconfiguration support apparatus 300 is implemented on an apparatus for which driving by a battery is assumed such as a portable terminal. Therefore, though various examples are listed for the above display 308, the communication I/F 309, the keyboard 310, the mouse 311, the scanner 312, and the printer 313, it is preferable that components suitable for implementation with respect to a portable terminal are selected. When implementation with respect to a portable terminal is difficult or when the load on the battery is significant, the implementation of the above hardware concerning input and output (the display 308, the communication I/F 309, the keyboard 310, the mouse 311, the scanner 312, and the printer 313) may be omitted.

FIG. 4 is a block diagram of a functional configuration of the dynamic reconfiguration support apparatus according to the first example. The configuration depicted in FIG. 4 is an exemplary implementation of the reconfiguration processing unit 100 described with reference to FIG. 1B. The dynamic-reconfiguration support apparatus 300 includes a threshold curve calculating unit 410 and a task dividing number calculating unit 420. These control units 410 and 420 are implemented by, for example, the CPU 301, the ROM 302, and the RAM 303 as above.

The threshold curve calculating unit 410 calculates a threshold curve that is a determination criterion for power consumption. The task dividing number calculating unit 420 divides all the PEs to be rewritten by the deadline time into numbers suitable for executing the rewriting during a unit time. The determination of the number suitable for the execution described above is executed based on the threshold curve calculated by the threshold curve calculating unit 410. Therefore, a specific procedure thereof will be described.

The threshold curve calculating unit 410 receives input of scheduling information 401, power consumption information 402, and battery information 403. FIG. 5A is a diagram of exemplary scheduling information. FIG. 5B is a diagram of exemplary power consumption information. FIG. 5C is a diagram of exemplary battery information.

As depicted in a table 510 of FIG. 5A, the names of tasks and respective deadline times (in this case, the execution completion times of the tasks) in order of execution corresponding to the number of tasks are input as the scheduling information. The power consumption information 402 is information obtained from a dynamically configurable circuit to be controlled by the dynamic-reconfiguration support apparatus 300 and, as depicted in a table 520 of FIG. 5B, information concerning the power consumption in real time at each time (for example, t0 to t3) of the timing obtained by the dynamic-reconfiguration support apparatus 300 is input. The battery information 403 is obtained from the battery that drives the dynamically configurable circuit and, as depicted in a table 530 of FIG. 5C, the battery capacity, the battery remaining amount (remaining power), and discharge current value are input.

Figure 6:
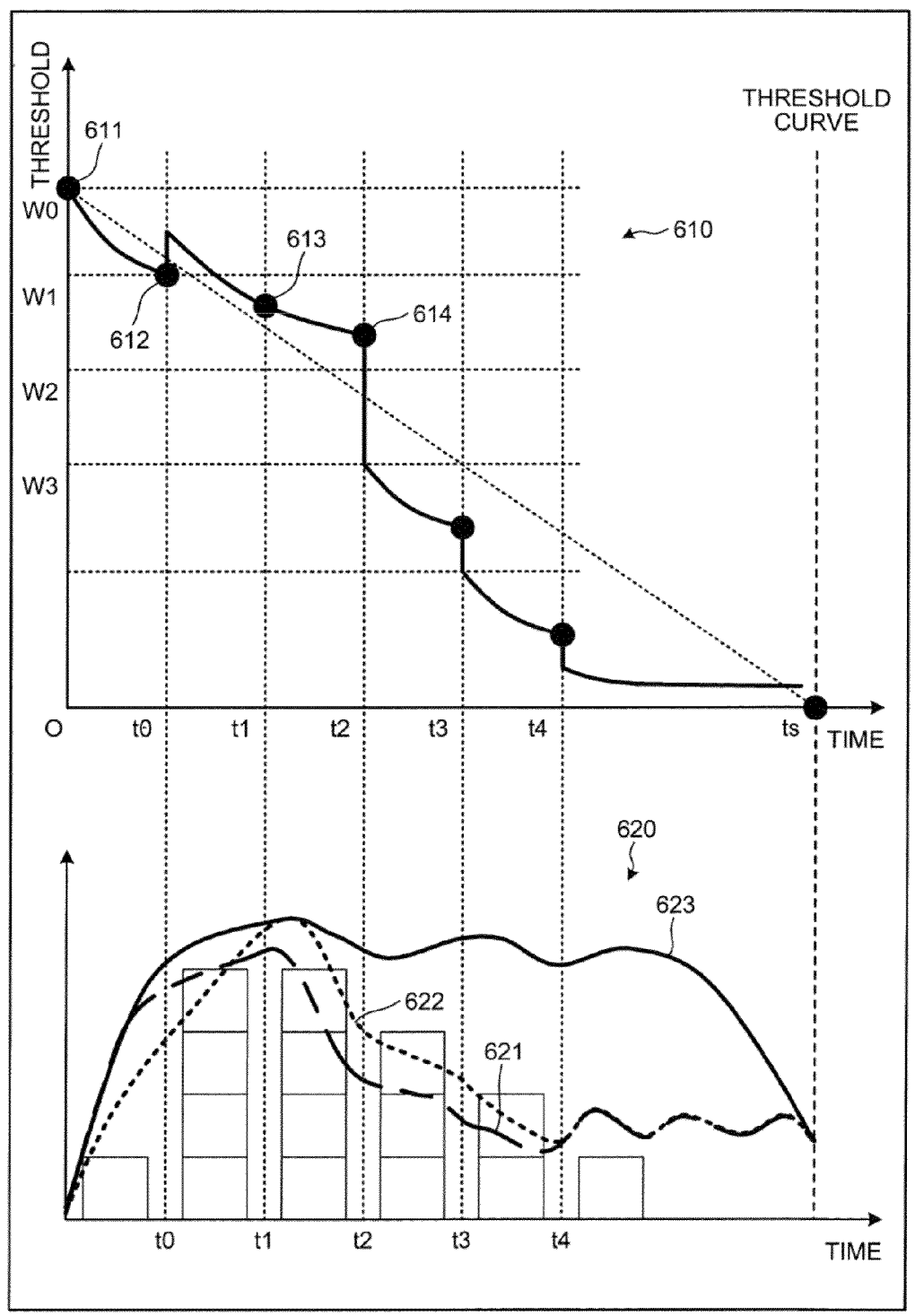
FIG. 6 is a diagram of a process of calculating a threshold curve.

The threshold curve calculating unit 410 calculates a threshold power 411 and a threshold curve equation 412 used until the deadline time. FIG. 6 is a diagram of a process of calculating the threshold curve. The calculating process of the threshold curve will be described in detail with reference to FIG. 6. A graph 610 in an upper portion of FIG. 6 represents exemplary calculation of the threshold curve obtained when a time period from the time 0 to ts is a dead period. A graph 620 in a lower portion of FIG. 6 indicates estimated variation of the power consumption and actual variation of the power consumption.

The threshold curve calculating unit 410 calculates, from the battery information and the scheduling information input, an estimated power value for a time period from the starting time of the rewriting "0" to "ts" that is a task deadline time and compares the actual battery remaining amount with the estimated power value at each of the predetermined times t0 to t4. Therefore, a curve representing the estimated power value is drawn from a plot 611 on the curve 610 to the t0 using the initial value (0<t<t0, an initial function (estimated value function) is applied as is).

At t=0, the battery remaining amount is compared with the estimated power value. It is determined at t0 that the battery still has some extra power because the battery remaining amount is higher than the estimated value thereof. Therefore, to correct the estimated value, recalculation is executed using the current power consumption information and thereby, a corrected threshold curve is calculated. Therefore, the recalculated threshold curve is drawn from a plot 612 to the t1 (t0<t<t1: a threshold curve that corresponds to the recalculation result at t0).

Similarly at t=1, the battery remaining amount is compared with the estimated power value. At t1, the battery remaining amount is higher than the estimated value similarly to the previous time (t=0) and the battery has some extra power. Therefore, the threshold curve is not recalculated and the threshold curve calculated at t0 is continuously drawn from a plot 613 to the t2 (t1<t<t2: the threshold curve corresponding to the recalculation result at T0).

At t=2, similarly to the process executed at t=1, the battery remaining amount is compared with the estimated power value. It is determined at t=2 that the battery has no extra power because the battery remaining amount is lower than the estimated value. Therefore, to correct the estimated value, recalculation is executed using the current power consumption information and the correct threshold curve is calculated. Therefore, a recalculated threshold curve is drawn from a plot 614 to the t3 (t2<t<t3: a threshold curve corresponding to the recalculation result at t2).

At t=3 and t=4, similarly, the battery remaining amount is compared with the estimated power value and, at t=3 and at t=4, the recalculation of the estimated value is executed according to whether the battery has extra power with respect to the remaining power. A curve 621 of the graph 620 represents the estimated value. A curve 622 represents the actual power consumption. As described, consecutive values of the estimated value calculated at intervals of a predetermined time period form the threshold curve as above.

In this case, the threshold is corrected such that the number of PEs to be rewritten at one time is increased when the battery has some extra power with respect to the remaining power, and the number of PEs to be rewritten at one time is reduced when the battery has no extra power with respect to the remaining power. Although the details of this will be described later, the number of PEs for which the rewriting process is executed at one time is set based on the threshold curve calculated by the above process as a criterion. Therefore, the calculation of the threshold curve corresponding to the remaining power becomes a factor to realize fluctuation of the peak power that is leveled as indicated by a curve 623.

A specific procedure of the calculating process of the threshold curve will be described. FIG. 7 is a flowchart of the process of calculating the threshold curve. As depicted in the flowchart of FIG. 7, the power value at the present time is stored in the memory and the threshold is read (step S701). The power value Wth at the present time read at step S701 is used as a battery remaining power value Wo.

It is determined whether the estimated value of the current remaining power obtained using an arbitrary fitting function f(t) set to obtain the threshold curve is between a lower limit 0 and the upper limit (that is the actual battery remaining amount Wth) of the power value (step S702). In this case, though the following equation (1) is used as a fitting function f(t), another function may be used referring to the characteristics and the operation test result of the battery. In this case, because the value of the battery remaining amount highly tends to attenuate while estimation of the variation is a precondition, an attenuating function is often suitable as the fitting function.

$$f(t)=(W_a e^{-(t_s-t)}-W_b e^{-(t_s-t)})+W_0 \qquad (1)$$

When the estimated value of the remaining power is between the lower limit 0 and the upper limit that is the actual battery remaining amount Wth of the power value at step S702 (step S702: YES), this means that the remaining power is higher than the estimated value and it is determined that the battery has some extra power. Therefore, to round up the dividing number for the PEs at a later stage, a rounding up flag K and a history flag H' are set up (step S703). On the other hand, when the estimated value of the remaining power is not between the lower limit 0 and the upper limit that is the actual battery remaining amount Wth of the power value (step S702: NO), this means that the remaining power is lower than the estimated value and it is determined that the battery has no extra power. Therefore, to round down the dividing number for the PEs at a later stage, the rounding up flag K and the history flag H' are each set back to 0 (step S704) and the procedure proceeds to the next process.

FIG. 8A is a diagram of the setting criteria of the rounding up flag. FIG. 8B is a diagram of the flag value stored in a register. A table to record an End flag, the rounding up flag K, and the history flag H is prepared, as depicted in a table 820 of FIG. 8B, in the register connectable to the threshold curve calculating unit 410.

Among the flags, the rounding up flag K is used in the determination as to whether the threshold curve is to be recalculated and in the setting of the dividing number for the PEs by the task dividing number calculating unit 420 described later, as depicted in a table 810 of FIG. 8A. The rounding up flags K set at steps S703 and S704 in the table 810 respectively represent the content (upper or lower) in the evaluation executed at the previous time and in the current evaluation. The content of the evaluation will be described. "Upper" taken as an example indicates that the battery is evaluated to have some extra power and upward correction is executed. On the contrary, "lower" indicates that the battery is evaluated to have no extra power and downward correction is executed. As to the evaluation of whether the battery has some or no extra power, the estimated power value based on the threshold curve is compared with the actual battery remaining amount and, when the actual remaining amount is higher than the estimated value remaining amount, the battery is evaluated to have some extra power.

Reference of the description returns to FIG. 7, the current power consumption value of the dynamically reconfigurable circuit is obtained from the power consumption information (step S705) and whether the rounding up flag K=1 and the history flag H=1 is determined (step S706). FIG. 8C is a diagram of a power value for each time. The value obtained at step S705 is recorded as depicted in a table 830. At step S706, the history flag H is a flag indicating the process executed at the previous time for the history flag H'. That is, when the history flag H' is set at t=n, the history flag H indicates the value set at t=n−1.

Therefore, naturally, no flag setting process executed at the previous time is present at the initial time and, therefore, "0" as the initial value is set for the history flag H. When the history flag is H=1, this indicates whether the battery has some extra power at the time of the evaluation executed at the previous time (t=n−1). "K=1" indicates that the battery currently has some extra power. That is, when the rounding up flag is K=1 and the history flag is H=1, this means that the threshold curve does not need to be recalculated.

When the rounding up flag is K=1 and the history flag is not H=1 at step S706 (step S706: NO), the function f on the threshold curve is recalculated (step S707) and the current battery remaining amount Wth is set again as the threshold power from the battery information (step S708). FIG. 8D is a diagram of an exemplary battery remaining amount. As depicted in a table 840, the battery remaining amount Wth obtained at step S708 is the battery remaining amount Wth=Wt at a time "t" and the battery remaining amount Wth=Wt+1 at a time "t+1". On the other hand, when the rounding up flag is K=1 and the history flag is H=1 (step S706: YES), the recalculation at step S707 is not executed and the procedure proceeds to the process at step S708.

Thereafter, to move to the process executed at the next time tn, the history flag H is updated to the value of the history flag H' set at step S703 or S704 (step S709). The current value of the threshold curve and the estimated value of the remaining power used until the deadline time are stored and the End flag is set up (step S710) and thereby, a series of processes come to an end. By the above processes, the threshold power 411 used until the deadline time and the threshold curve equation 412 are output.

Reference of the description returns to FIG. 4, the threshold power 411 used until the deadline time and the threshold curve equation 412 are output from the threshold curve calculating unit 410. The task dividing number calculating unit 420 receives input of the threshold power 411 used until the deadline time, the threshold curve 412, and a number of blocks (PEs) to be rewritten 404, and calculates the number of PEs for which rewriting (mapping) is to be executed during a unit time. The number of blocks to be rewritten 404 may be obtained from information concerning the tasks included in the scheduling information 401 or may be externally obtained.

FIG. 9 is a flowchart of a task dividing number calculating process. As depicted in the flowchart of FIG. 9, the task dividing number calculating unit 420 determines whether a dividing number N set to be the initial dividing number set as the initial value is between the lowest dividing number and the highest dividing number (step S901). The initial dividing number is obtained according to equation 2. The lowest dividing number obtained by dividing the value obtained by subtracting the dividing number set at the previous time N'B from NB−N'B (the number of blocks (PEs) to be written that currently remain) by tD−t (the remaining time until the deadline time). That is, this means that the rewriting is not finished by the deadline time if at least this number of PEs are not rewritten at one time.

$$N=NB/tD: \text{The number of blocks to be written/deadline time} \quad (2)$$

The highest dividing number is a value obtained by dividing the current number of blocks (PEs) that remain to be written NB by the current dividing number tD. When the dividing number N is not between the lowest dividing number and the highest dividing number at step S901 (step S901: NO), if the dividing number N is equal to or lower than the lowest dividing number, the lowest dividing number is set to be the dividing number N and, if the dividing number N is larger than the highest dividing number, the highest dividing number is set as the dividing number N and thereby, a series of processes comes to an end.

On the other hand, when the dividing number N is between the lowest dividing number and the highest dividing number (step S901: YES), the procedure proceeds to a process of recalculating the dividing number N to set the dividing number N to be a more suitable value. The current remaining power value is read (step S902) and a threshold-power ratio R is calculated (step S903). The ratio is a value representing the ratio of the current remaining power estimated value f(t) obtained from the threshold curve equation 412 and the actual power value Wt.

The remaining power estimated value f(t) is obtained using a function that is selected corresponding to the variation of the actual power value from a group of functions given in advance as the following equations 3 to 5. For the threshold curve of the graph 610 of FIG. 6, the function of the following equation 3 is applied when t is 0<t≦t1, the function of the following equation 4 is applied when t is t1<t≦t2, and the function of the following equation 5 is applied when t is t2<t≦t3.

$$0 < t \leq t_1$$

$$\eta(t) = W_{t1} e^{-(t_s-t)} + C_1 \quad (3)$$

$$0 < t \leq t_2$$

$$f(t) = W_{t2} e^{-(t_s-t)} + C_2 \quad (4)$$

$$0 < t \leq t_3$$

$$\eta(t) = W_{t3} e^{-(t_s-t)} + C_3 \quad (5)$$

Therefore, in the next process, a dividing number N' suitable for the actual power value is calculated by multiplying the current dividing number N and the threshold power R (step S904). Thereafter, the threshold curve calculating unit 410 determines whether the bit of the rounding up flag K set at each of the times t0 to t4 is set up (step S905). At step S905, whether a fraction of the dividing number N is rounded up or rounded down is determined according to the value of the rounding up flag K.

Whether the battery has some extra power may be determined at the current determination and at the previous determination based on the value of the rounding up flag K as depicted in the table 810 of FIG. 8A. Therefore, when the bit of the rounding up flag K is set up at step S905 (step S905: YES), the fraction of the dividing number N is rounded up (step S906). When the bit of the rounding up flag K is not set up (step S905: NO), the fraction of the dividing number N is rounded down (step S907) and the procedure proceeds to the process at step S908.

The dividing number N' subject to the rounding up or rounding down process at step S906 or S907 is updated as the dividing number N obtained by the recalculation (step S908). The bit of the End flag described with reference to FIG. 8B is set up and an interruption command is issued (step S909), and a series of processes comes to an end.

The dividing number N for each time t calculated by the task dividing number calculating process as described is output as a PE dividing number 421. The dynamic-reconfiguration support apparatus 300 executes, with respect to the dynamically reconfigurable circuit 110, the rewriting of the PEs of the number corresponding to the PE dividing number 421 at each time t. Consequently, the rewriting of the PEs executed by the dynamically configurable circuit 110 is a process having a small variation of the peak value in terms of the power consumption calculated by the dynamic-reconfiguration support apparatus 300 and therefore, the load on the battery can be minimized.

FIGS. 10 to 13 are block diagrams of exemplary configurations of the dynamically configurable circuit. Any of the following first to fourth exemplary configurations, respectively having hardware (HW) configurations that differ, is a circuit that may execute dynamic reconfiguration and may implement dynamic reconfiguration support processing.

A first exemplary configuration represents an exemplary implementation of the functions of the dynamic reconfiguration support processing by software (SW) in the dynamically reconfigurable circuit as depicted in FIG. 10. A dynamically reconfigurable circuit 1000 depicted in FIG. 10 includes reconfigurable HW 1001 having a group of rewritable PEs thereon, a processor 1002, a battery information obtaining device 1003, a power consumption information obtaining device 1004, and a memory 1005. The HW components 1001 to 1005 are connected through a processor local bus (PLB) 1006.

In the dynamically reconfigurable circuit 1000, the processor 1002 has mounted thereon a dynamic-reconfiguration support program that implements the functional units described with reference to FIG. 1B. Therefore, while the dynamically reconfigurable circuit 1000 is under operation, efficient PE rewriting may be realized by causing the circuit 1000 to execute the dynamic-reconfiguration support program. Because the functions of the dynamic reconfiguration support processing are realized by SW, even when changes of the specification occur, the circuit may be modified easily. Therefore, the circuit 1000 is suitable for an implementation pattern to which flexibility of the functions is demanded.

Figure 11:
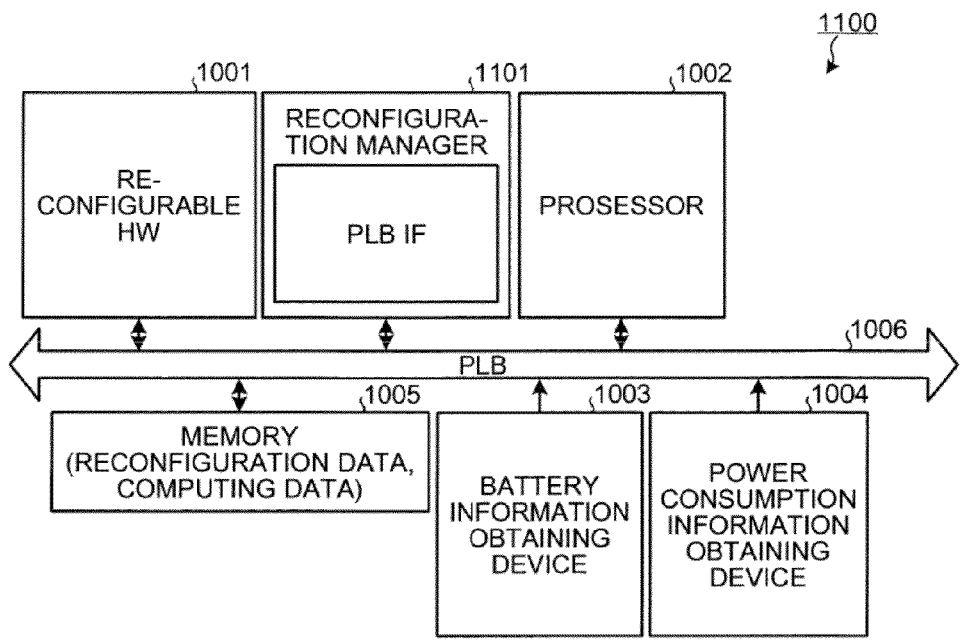
FIG. 11 is a block diagram of exemplary configurations of a dynamically configurable circuit.

FIG. 11 depicts an exemplary implementation of the functions of the dynamic reconfiguration support processing by independent HW. For the dynamically reconfigurable circuit 1000, a reconfiguration manager 1101 is prepared as dedicated HW to implement the dynamic reconfiguration support processing. In the reconfiguration manager 1101, the functional units (410 and 420) of the dynamic-reconfiguration support apparatus 300 described with reference to FIG. 4 are implemented. Different from the dynamic reconfigurable circuit 1000 of the first exemplary configuration, a dynamically reconfigurable circuit 1100 executes the dynamic reconfiguration support processing by independent HW. Therefore, the circuit 1100 realizes a higher processing speed compared to the first exemplary configuration and therefore, the circuit 1100 is suitable for an implementation pattern whose processing speed has top priority.

Figure 12:
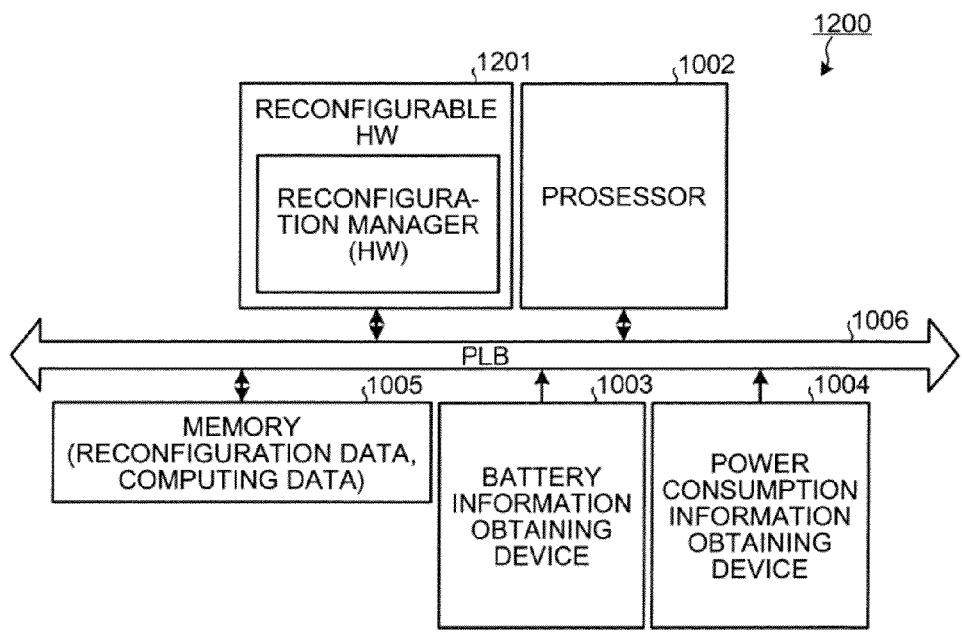
FIG. 12 is a block diagram of exemplary configurations of a dynamically configurable circuit.

FIG. 12 depicts an exemplary implementation of the dynamic reconfiguration support processing by HW implemented in reconfigurable HW. A dynamic reconfigurable circuit 1200 implements the functions of the dynamic reconfiguration support processing using reconfigurable HW 1201 formed by mounting the corresponding HW inside the reconfigurable HW 1001 by the reconfiguring manager 1101 used in the dynamically reconfigurable circuit 1100 of the second exemplary configuration. The circuit 1200 realizes a higher processing speed compared to the first exemplary configuration and flexible operation is enabled by employing another HW approach. Therefore, the circuit 1200 is suitable for an implementation pattern to which both of flexibility and a high speed are desired.

Figure 13:
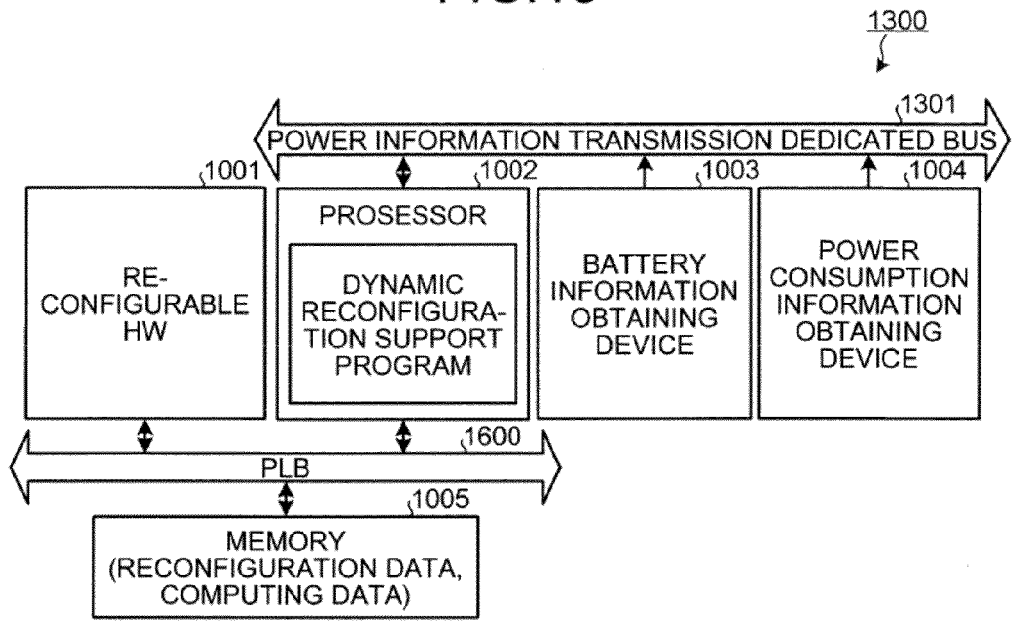
FIG. 13 is a block diagram of exemplary configurations of a dynamically configurable circuit.

FIG. 13 depicts an example that further includes a dedicated bus to transmit to the processor, the power information such as the battery information and the power consumption information, for executing implementation by SW. The basic configuration thereof is identical to that of the dynamically reconfigurable circuit 1000 of the first exemplary configuration. However, a power information transmission dedicated bus 1301 is prepared for dedicated transmission and reception of data among the processor 1002, the battery information obtaining device 1003, and the power consumption information obtaining device 1004. Having dedicated communication to execute the dynamic reconfiguration support processing enables further increase in processing speed. Even when multiple processes other than the dynamic reconfiguration support processing are executed in the dynamically reconfigurable circuit 1300, congestion in the PLB 1006 does not affect processing and therefore, the circuit 1300 is suitable for an implementation pattern for which the dynamic reconfiguration support processing has top priority.

In each of the above exemplary configurations, the battery information obtaining device 1003 may, for example, obtain the battery information 403 through a power source LSI that monitors the battery power. For example, a measuring device that measures the number of transitions of the gate output is provided inside the reconfigurable HW 1001, and the power consumption information obtaining device 1004 may obtain the power consumption information 402 from the measurements obtained by the measuring device. In any of the examples above, the battery information obtaining device 1003 and the power consumption information obtaining device 1004 may be realized by known techniques and therefore, other known techniques may be used for these devices.

An exemplary process that handles specific values using the dynamic-reconfiguration support apparatus 300 will be described as an example. An exemplary process described below is an example for changing encryption schemes implemented in a portable apparatus during execution.

Figure 14:
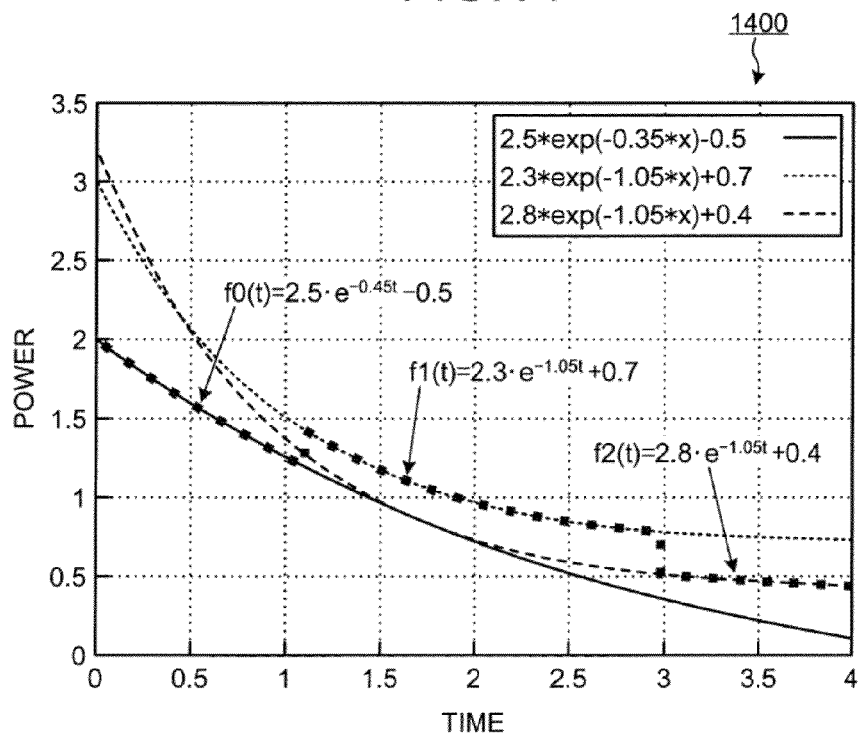
FIG. 14 is a graph of a group of functions used in a calculation of the threshold curve.

FIG. 14 is a graph of a group of functions used in the calculation of the threshold curve. In this example, $f0(t)$, $f1(t)$, and $f2(t)$ (equations 3 to 5) depicted in a graph 1400 are used. However, the $f0(t)$ is used as the initial function. The threshold initially set corresponding to the current remaining power is 2.0 mWh and the deadline time is 10 minutes (min). The number of PEs to be rewritten is 25. Therefore, the initial dividing number for the PEs is 25/10=2.5.

Figure 15:
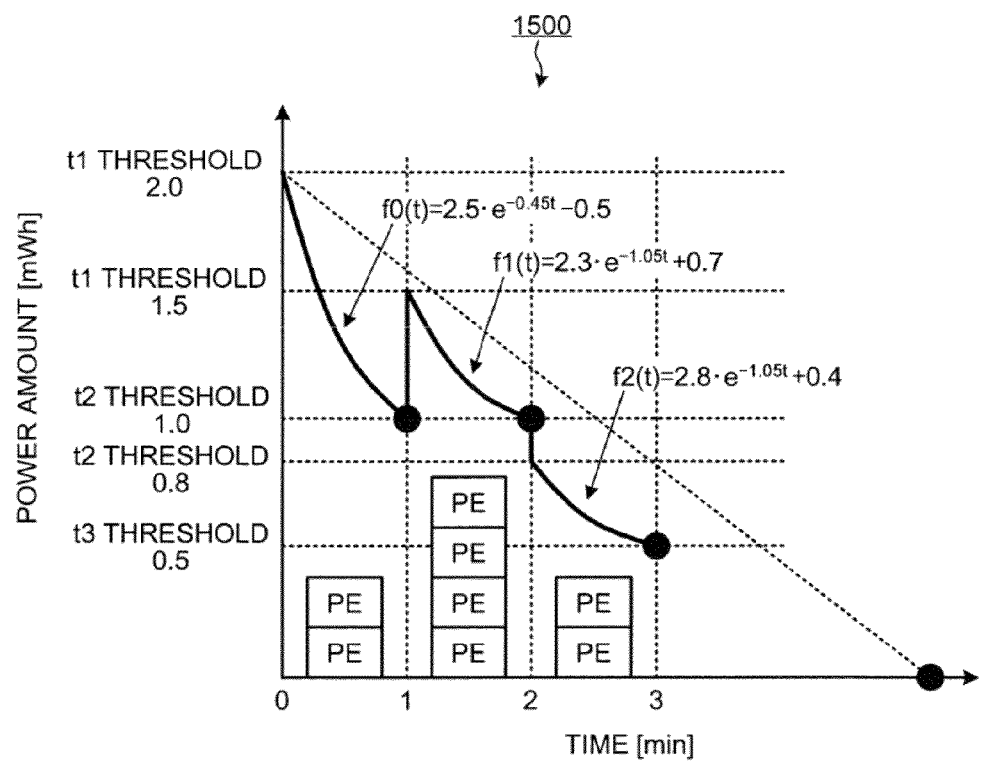
FIG. 15 is a graph of exemplary calculation of the threshold curve.

FIG. 15 is a graph of exemplary calculation of the threshold curve. As depicted in a graph 1500 of FIG. 15, the threshold curve is calculated using the $f0(t)$ as the initial function from the time 0. When the time reaches the time t=1 that is initially set, the estimated value of the remaining power is compared with the actual battery remaining amount. When $f0(t)=1.09$ and the battery remaining amount is 1.5 mWh, it is determined that the battery has some extra power, and the threshold curve is recalculated using $f1(t)$.

The dividing number for the PEs is recalculated from the comparison result obtained at t=1. That is, the actual battery remaining amount is "1.5"/calculation result "1.09"=1.38. This value represents the ratio of the dividing number for the PEs desired to be actually rewritten and the initial dividing number, i.e., the threshold-power ratio R described with reference to FIG. 9 (the number of PEs desired to be actually rewritten is 1.38 times the initial dividing number). Therefore, multiplying the initial dividing number 2.5 by 1.38 yields 3.45 and 3.45 is rounded up (see FIG. 9); hence, the dividing number at t=1 is four.

Similarly, when the time is t=2, the estimated value of the remaining power at $f1(2)$ set by the above recalculation is compared with the actual battery remaining amount. At this time, $f1(2)=0.98$ and the battery remaining amount is 0.5 mWh. Therefore, it is determined that the battery has no extra power, and the threshold curve is recalculated using $f2(t)$. At this time, similarly, the dividing number for the PEs is recalculated from the comparison result obtained at t=2. That is, the actual battery remaining amount "0.5"/calculation result "0.98"=0.5 (the threshold-power ratio R). The value 0.5 obtained at this time means that the number of PEs to be rewritten suitable for the actual remaining power is 0.5 times the initial dividing number currently set.

At t=2, the lowest dividing number at each time t is obtained such that the rewriting of all the PEs is finished by the deadline time, and the dividing number is set such that the dividing number is larger than this lowest dividing number. The lowest dividing number is obtained by dividing the number of remaining PEs, 23 PEs, by the remaining deadline time 9 min. As the result of the calculation, the lowest dividing number is 2.5 PEs and when the dividing number is set, the dividing number is compared with 2.5 and is set. The dividing number at t=1 is four and the ratio of the dividing number desired to be actually rewritten and the current dividing number is 0.5. Therefore, the dividing number is 2.0 and is compared with the lowest number calculated as above and, from K=0, the number is rounded down (see FIG. 9). Therefore, the dividing number at t=2 is 2. The above process is similarly executed at each of times t=3, 4, . . . , and 9 and thereby, reconfiguration processing using the PEs divided such that the variation of the power consumption is small, can be realized.

As described, according to the first example, the rewriting process of all the PEs that are to be rewritten is executed being distributed with respect to the deadline time within which the rewriting of the PEs is completed. Therefore, the peak of the power consumption value may be suppressed at a low level regardless of the content of the tasks executed by the dynamically reconfigurable circuit. The number of PEs to be rewritten is adjusted such that the variation of the power consumption peak whose level is suppressed also becomes small and therefore, the reconfiguration processing whose load on the battery is minimized can be realized.

In a second example, the number of PEs to be rewritten during each unit time is calculated taking into account further a temperature characteristic of the battery that drives the dynamically reconfigurable circuit when the above dynamic reconfiguration support processing according to the first example is executed (dynamic reconfiguration support processing with the temperature estimating unit 111 and the dividing number correcting unit 112 prepared therefor that are described with reference to FIG. 1). Therefore, the dynamic reconfiguration support processing in the second example is implemented by adding to the configuration of the first example, a device to obtain the temperature information of the battery, a functional unit that calculates temperature estimation information that indicates the temperature variation of the battery from the temperature information obtained, and a functional unit that according to the temperature estimation information, corrects the PE dividing number 421 calculated by the task dividing number calculating unit 420 (see FIG. 4).

Figure 16:
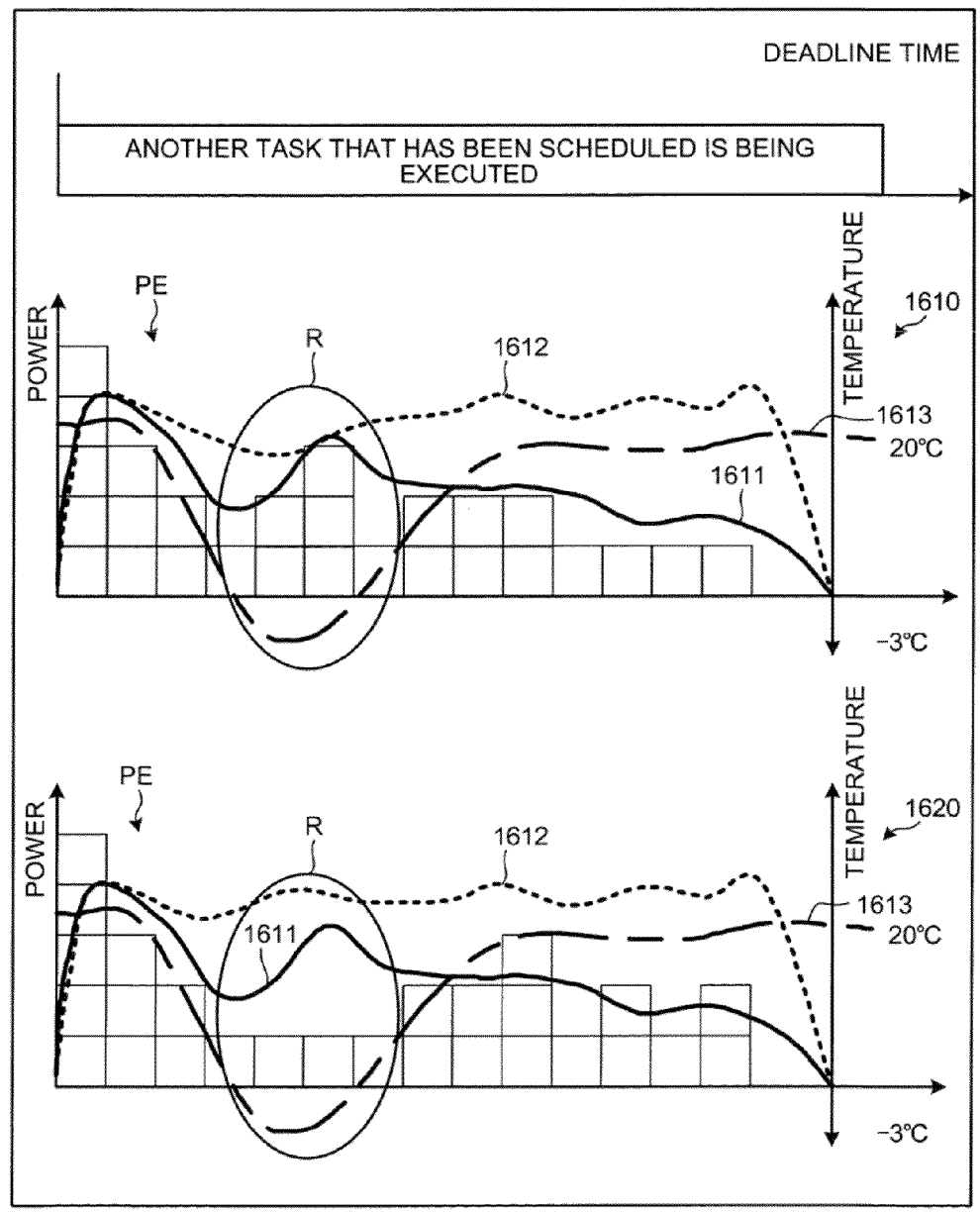
FIG. 16 is a diagram depicting relation between mapping by the dynamic reconfiguration support processing, and battery temperature.

The relation between the battery temperature and mapping in the dynamic configuration will be described. FIG. 16 is a diagram depicting the relation between the mapping by the dynamic reconfiguration support processing, and the battery temperature. In the example depicted in FIG. 16, similarly as in FIG. 2, the dynamic reconfigurable circuit 110 is to complete the rewriting of the PEs of the predetermined number by the deadline time.

A graph 1610 in an upper portion of FIG. 16 depicts PE division implemented by the dynamic reconfiguration processing of the first example. In the graph 1610, a curve 1611 indicates the variation of power consumption of the CPU that operates the dynamically configurable circuit 110. A curve 1612 indicates the variation of power consumption of the entire system including the dynamically configurable circuit 110 when the number of PEs to be rewritten during each unit time is divided and the rewriting is executed. A curve 1613 indicates temperature variation of the battery.

Figure 17:
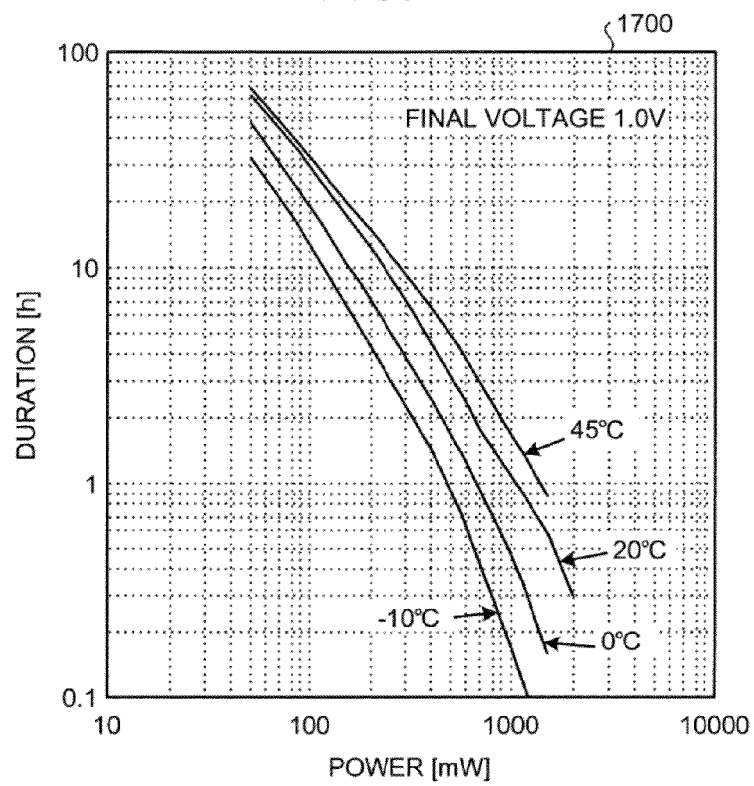
FIG. 17 is a graph of temperature characteristics of a battery.

When the dynamic reconfiguration support processing of the first example is implemented, variation of the power consumption of the entire system is leveled as indicated by the curve 222 of FIG. 2. However, local drops in the power consumption occur in the case of the curve 1612. This is because of the influence of variations in output associated with temperature characteristics of the battery. The temperature characteristic of the battery will be described. FIG. 17 is a graph of temperature characteristics of the battery. A graph 1700 depicts fixed-power continuous discharge of batteries of the same type for some battery temperatures. Generally, the power output tends to be higher as the battery temperature increases. For example, in the case of an exemplary temperature variation of the graph 1700, when the battery temperature varies from 0° C. to 45° C., the power output is increases by 1.2-fold. This power output directly influences the output duration of the battery.

Figure 18A:
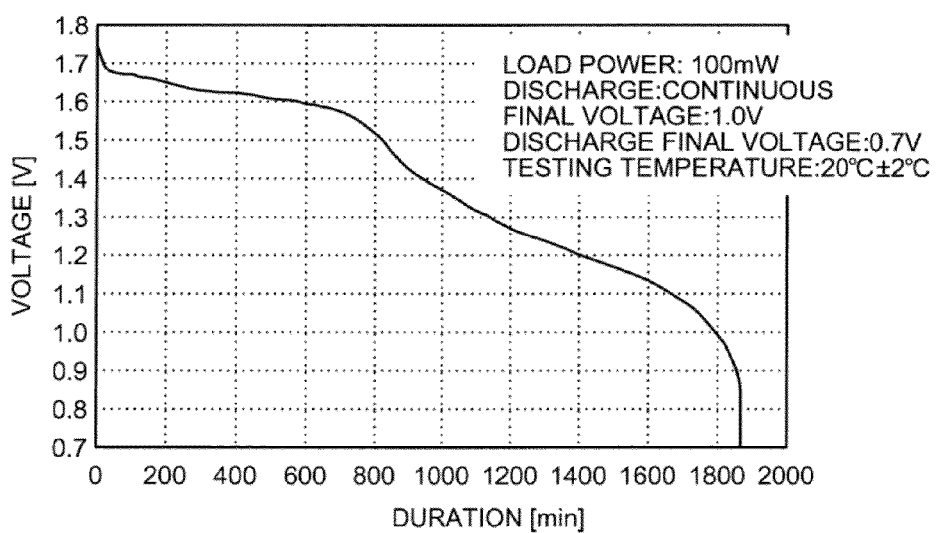
FIG. 18A depicts duration of the battery for 100 mW discharge.
Figure 18B:
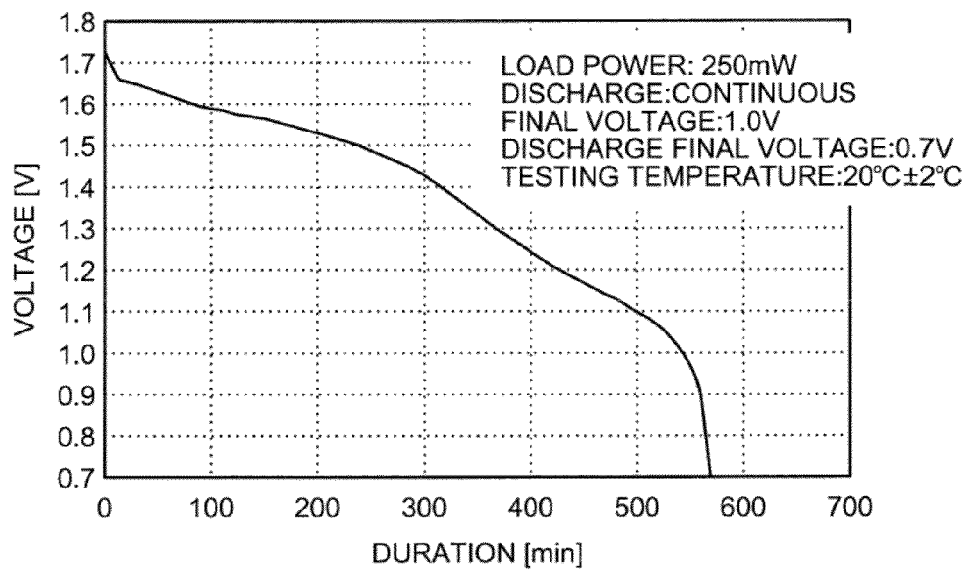
FIG. 18B depicts duration of the battery for 250 mW discharge.
Figure 18C:
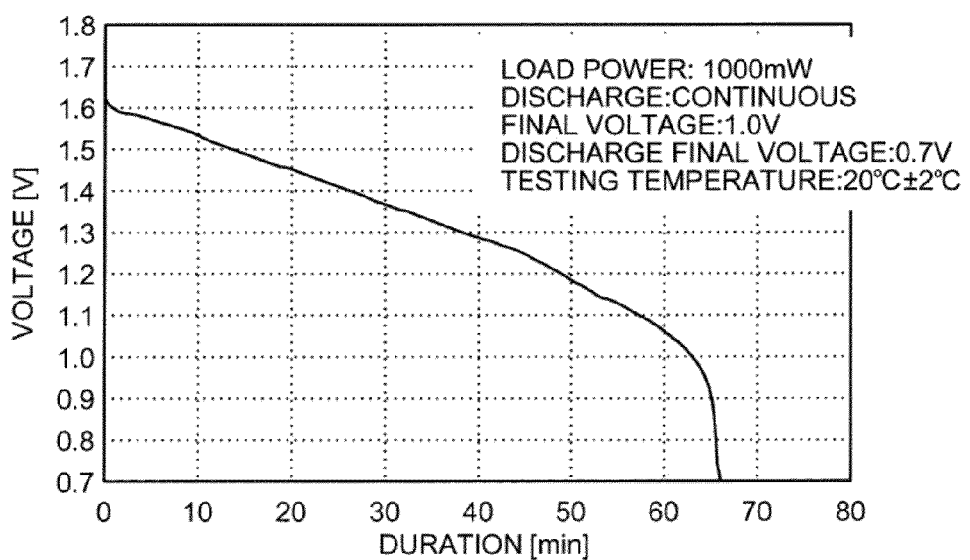
FIG. 18C depicts duration of the battery for 1000 mW discharge.

FIGS. 18A to 18C are graphs depicting the relations between the power output and the duration thereof. FIG. 18A depicts the duration of the battery for 100 mW discharge. FIG. 18B depicts the duration of the battery for 250 mW discharge. FIG. 18C depicts the duration of the battery for 1000 mW discharge. When the difference in power output by a battery is 4-fold, as in a case of 1,000 mW discharge and 250 mW discharge, the duration of 1,000 mW discharge is about 60 min, whereas the duration of 250 mW discharge is about 600 min. When the difference in power output by a battery is 10-fold, as in a case of 1,000 mW discharge and 100 mW discharge, the duration of 1,000 mW discharge is about 60 min, whereas the duration of 100 mW discharge is about 1,800 min.

As described, when the power output becomes four times the original power, the duration is reduced to 1/10 of the original duration and, when the output power becomes ten times the original power, the duration is reduced to 1/30 of the original duration. Thus, it is clear that, when temperature variation of the battery occurs, the variation affects the power output. Variation of the power output significantly affects the life of the battery. Therefore, when temperature variation of the battery occurs, the PEs are to be divided taking into account the variation of the output associated with the temperature variation. A graph 1620 depicted in FIG. 16 is derived by the dynamic reconfiguration support processing that takes into account temperature variation. Therefore, in the second example, to cope with the above situation, the load on the battery is reduced by reducing the number of PEs to be rewritten during a period of a range R within which the temperature of the battery drops.

More specifically, in addition to the scheduling information, the battery capacity, and the power consumption information, the temperature information of the battery is obtained and the dividing number for the PEs for each predetermined time period is calculated in the dynamic reconfiguration support processing according to the second example. The procedure thereof is that the battery power consumption estimated curve is calculated similarly to the first example. Thereafter, the temperature estimated curve representing the temperature variation of the battery is calculated, the two curves are combined, and the battery remaining amount estimated curve is calculated. The number of PEs to be rewritten may be calculated based on the battery estimated curve alone.

Figure 19:
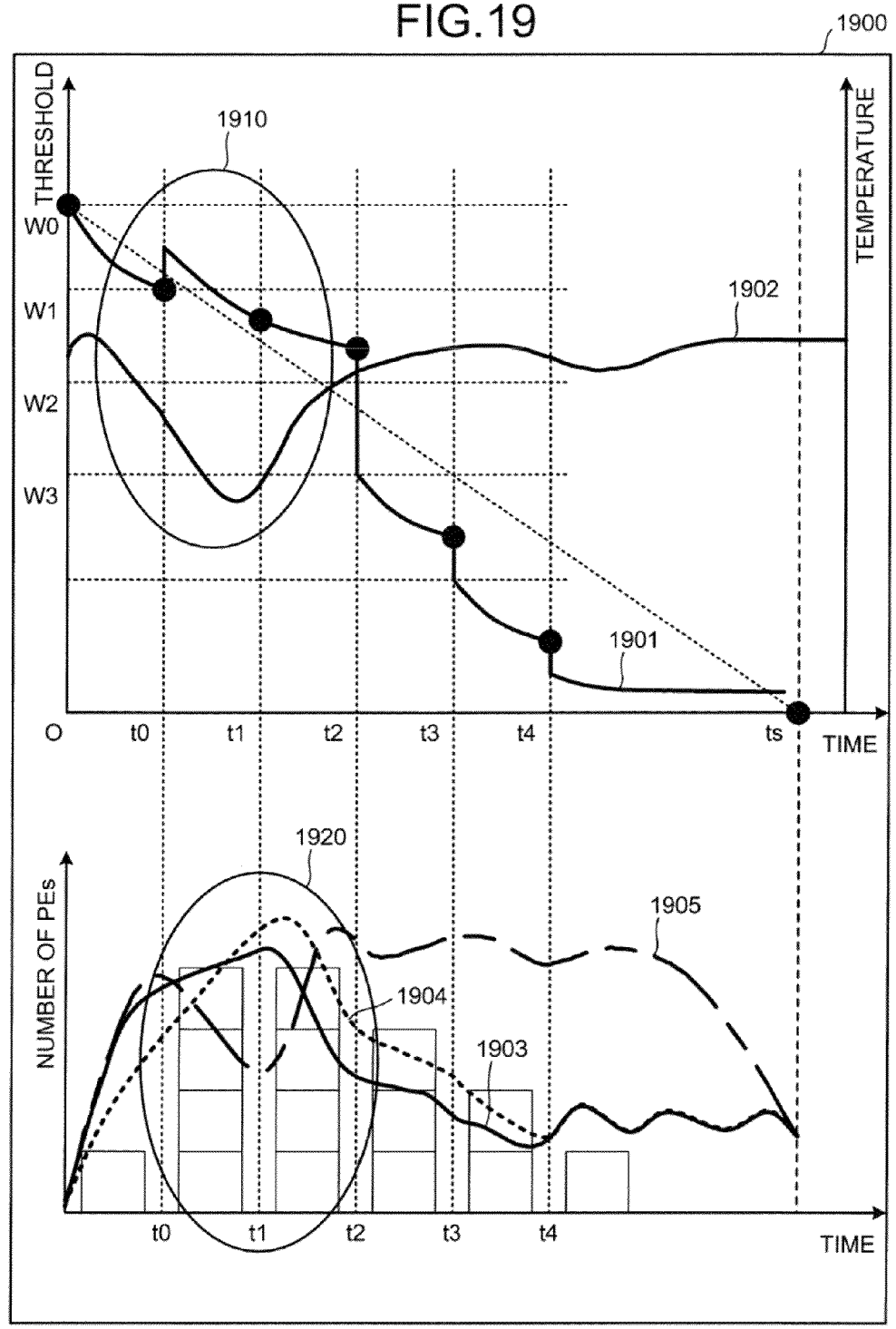
FIG. 19 is a diagram of the threshold curve and dividing number before correction using a temperature estimated curve.

FIG. 19 is a diagram of the threshold curve and the dividing number before the correction using the temperature estimated curve. FIG. 20 is a diagram of the threshold curve and the dividing number after the correction using the temperature estimated curve. A graph 1900 of FIG. 19 indicates a threshold curve 1901 created by the dynamic reconfiguration support processing according to the first example. The variation estimation of the battery in this case is indicated by an estimated-temperature curve 1902.

The lower portion of the graph 1900 depicts the dividing number for the PEs for each unit time (t). A curve 1904 indicates the power consumption estimated from the threshold curve 1901. The curve 1904 indicates the actual power consumption. A curve 1905 indicates the actual temperature variation. In the graph 1900, the number of PEs for which the rewriting is executed is excessive during the period of a range 1920 depicted in the lower portion because the temperature drop occurring during the range 1910 is not taken into account.

In the dynamic reconfiguration support processing according to the second example, the threshold curve 1901 is corrected using the above temperature estimated curve 1902 and, thereby, the dividing number for the PEs for each unit time is corrected. Therefore, as depicted in a graph 2000 of FIG. 20, the PEs may be divided using, alone, a corrected threshold curve 2001 obtained by correcting the threshold curve 1901 using the temperature estimated curve 1902. Because the number of PEs is corrected based on the battery temperature, the load on the battery is reduced and local drops in the battery temperature, such as that in the range 1920 of FIG. 19, are cancelled. Therefore, the temperature variation of the battery is leveled as represented by a curve 2005.

A dynamic reconfiguration support apparatus implementing the dynamic reconfiguration support processing according to the second example will be described. The hardware configuration is implemented by a configuration identical to that of the dynamic-reconfiguration support apparatus 300 according to the first example and therefore, description thereof is omitted. Description that overlaps the first example is omitted.

With respect to a functional configuration of the dynamic reconfiguration support apparatus according to the second example, a portion that differs from that of the first example will be described. FIG. 21 is a block diagram of a functional configuration of the dynamic reconfiguration support apparatus according to the second example. As depicted in FIG. 21, the dynamic reconfiguration support apparatus 2100 according to the second example is formed by newly adding a temperature estimating unit 2110 and a dividing number correcting unit 2120 to the dynamic-reconfiguration support apparatus 300 described with reference to FIG. 4.

The threshold curve calculating unit 410 and the task dividing number calculating unit 420 of the reconfiguration support apparatus 2100 execute processes identical to those of the first example. A PE dividing number 2103 corrected by the dividing number correcting unit 2120 is created using temperature estimation information 2102 and the PE dividing number 421 created by the temperature estimating unit 2110. The processes of the temperature estimating unit 2110 and the dividing number correcting unit 2120 will be described.

The temperature estimating unit 2110 obtains current temperature information 2101 of the battery, obtains the amount of variation of the temperature information 2101 for each predetermined time period, and by making the temperature information 2101 be proportional to this variation amount, creates the temperature estimation information 2102 of the battery for the next predetermined time period. FIGS. 22 and 23 are graphs of exemplary creation of the temperature estimation curve. As depicted in a graph 2200 of FIG. 22, the temperature estimating unit 2110 estimates the trend of the temperature by extracting inflection points of a temperature variation curve 2201 obtained by continuously obtaining the temperature information 2101. At this time, the temperature information 2101 obtained by the temperature estimating unit 2110 indicates a phenomenon caused by chemical changes and therefore, it takes some time for the influence of the temperature variation to affect the output of the battery. Thus, the temperature variation during the next time interval (for example, t1 to t2) is estimated from the variation of the temperature information 2101 during the current time interval (for example, t0 to t1).

For example, noting the temperature variation curve 2201 between t0 and t1, the temperature decrease starts at an inflection point 1 as a turning point and therefore, it is estimated that a voltage drop occurs during the next time interval between t1 to t2. Similarly, noting the temperature variation curve 2201 between t1 and t2, the temperature increase starts at an inflection point 2 as a turning point and therefore, it is estimated that a voltage rise occurs during the next time interval between t2 to t3. In this manner, by estimating the trend of the temperature variation for the next time interval from the temperature information 2101 obtained during the current time interval, the temperature estimation curve as a curve 2301 of a graph 2300 is created.

FIG. 24 is a flowchart of a dividing number correcting process. As depicted in the flowchart of FIG. 24, a correcting process starts with the creation of the PE dividing number 421 as a trigger. Whether the current dividing number N (the PE dividing number 421) is the least dividing number is determined (step S2401). When the dividing number is the least dividing number (step S2401: YES), no correction is necessary and therefore, the process comes to an end and the PE dividing number 421 is output as the PE dividing number 2103 after correction.

When the current dividing number is not the least dividing number at step 2401 (step S2401: NO), an estimated output power value Wp is obtained from the temperature estimated value at the time t+1 (step S2402). To obtain the estimated output power value Wp, temperature characteristic information corresponding to the battery as depicted in FIG. 17 is prepared and the temperature corresponding to the temperature estimated value may be referred to alone.

The power ratio Wr is calculated by dividing the estimated output power value Wp by the current power value W (step S2403). If the power ratio Wr obtained at this step is a negative value, that is, W>Wp, the power decreases and therefore, the load on the battery is to be reduced. Therefore, the dividing number N' is calculated by multiplying the power ratio Wr and the current dividing number N (step S2404). The processes at the steps S2405 to S2409 thereafter are identical to those of the steps S905 to S909 described with reference to FIG. 9.

In this manner, when the power ratio Wr calculated at step S2403 is a negative value, the dividing number N is corrected to the dividing number N' that represents a number of PEs that is smaller than the dividing number N and therefore, the load on the battery is reduced. On the contrary, when the power ratio Wr is a positive value, the dividing number N is corrected to the dividing number N' that represents a number of PEs that is larger than the dividing number N and therefore, the load on the battery is increased. The dividing number N updated at step S2408 is output as the PE dividing number 2103 after the correction.

As described, the dynamic reconfiguration support apparatus 2100 according to the second example corrects the number of PEs based on the temperature variation of the battery and therefore, any process that imposes an unnecessarily heavy load on the battery may be prevented. Consequently, the power consumption may be leveled and the battery may be used more efficiently.

To configure a dynamically reconfigurable circuit including the functions of the dynamic reconfiguration support apparatus 2100 according to the second example, only a functional unit that obtains the temperature information of the battery is added to the exemplary configuration described with reference to FIGS. 10 to 13.

Figure 25:
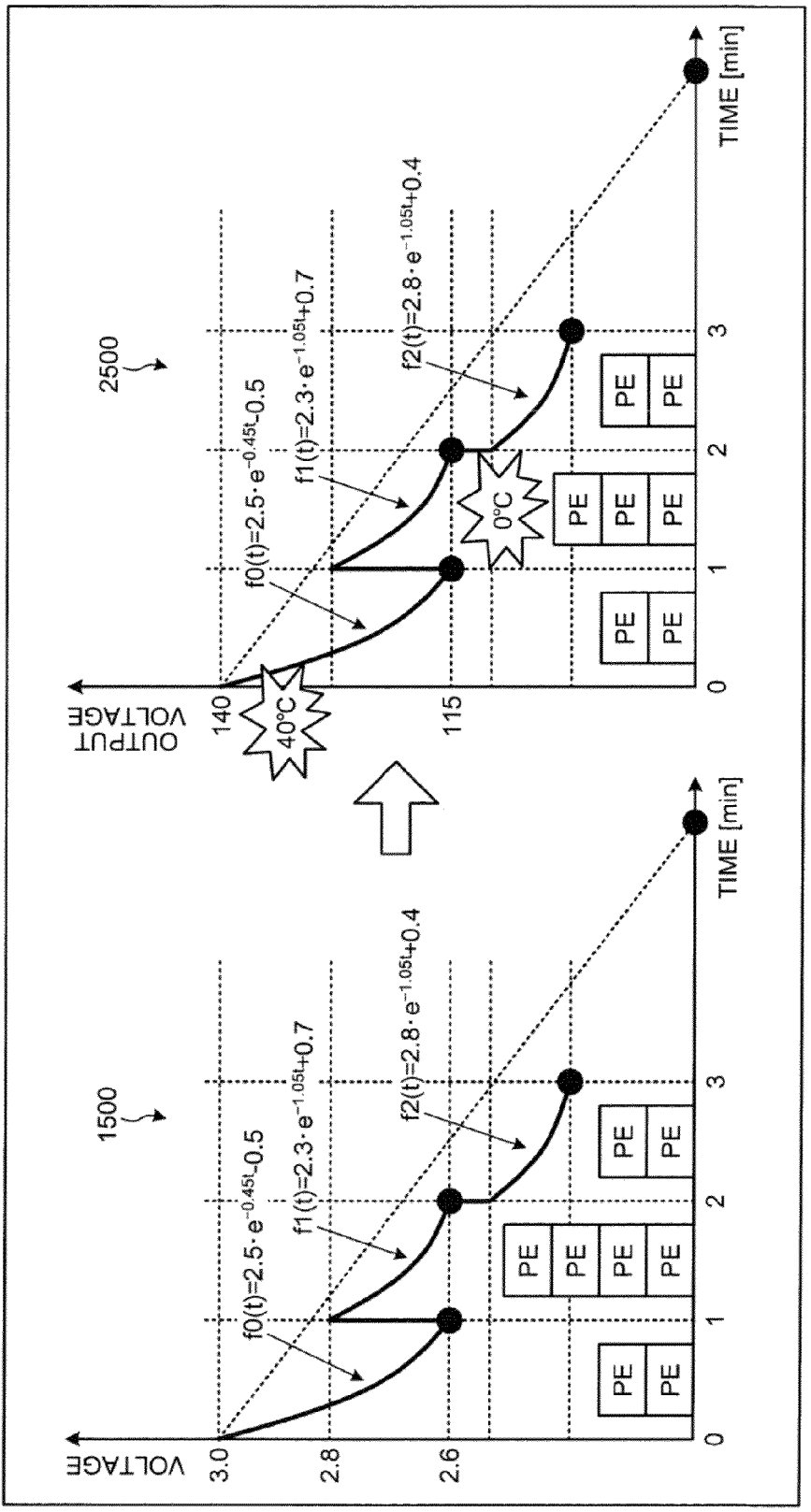
FIG. 25 is a diagram of exemplary calculation of the threshold curve corresponding to temperature variation.
Figure 26:
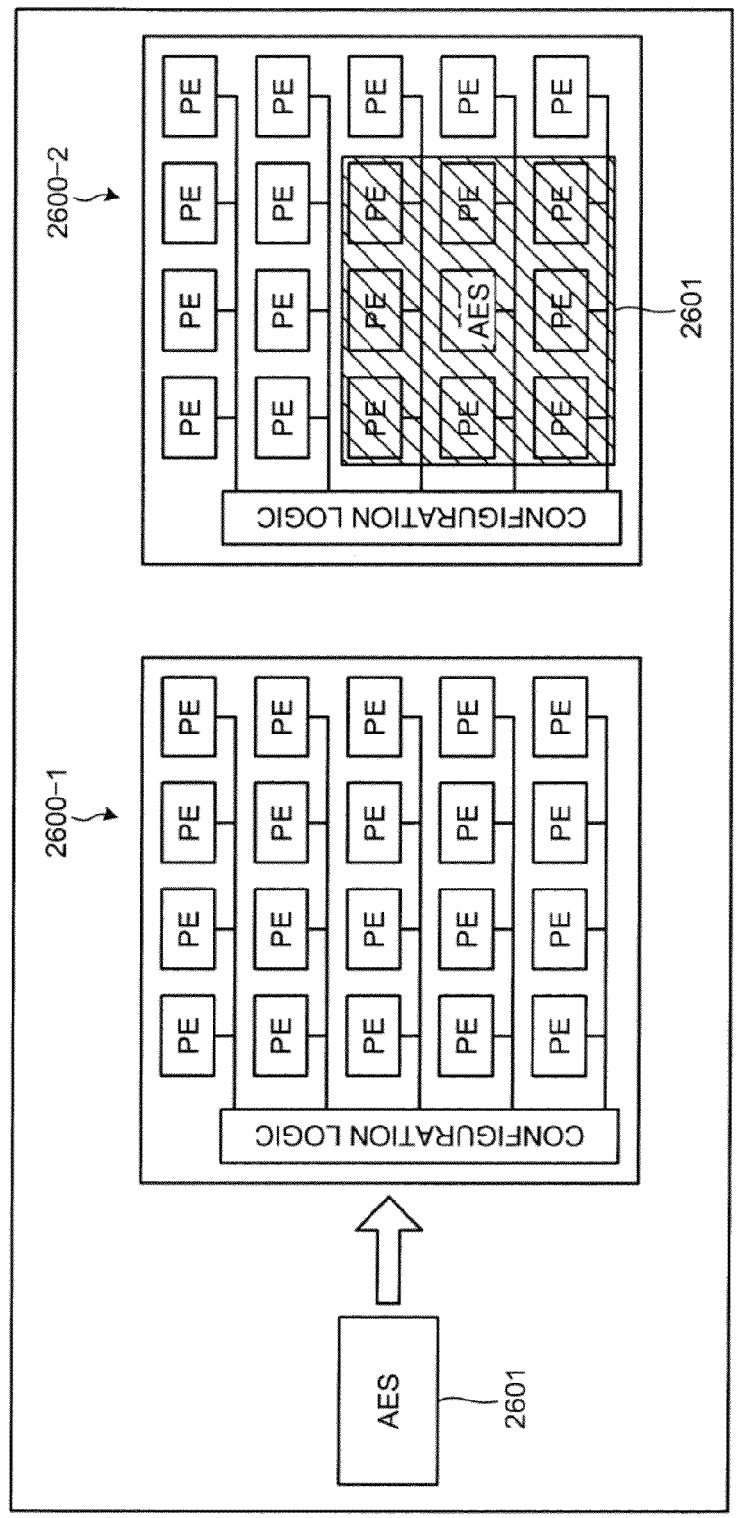
FIG. 26 is a diagram of a hardware rewriting process of a conventional dynamically reconfigurable circuit.
Figure 27:
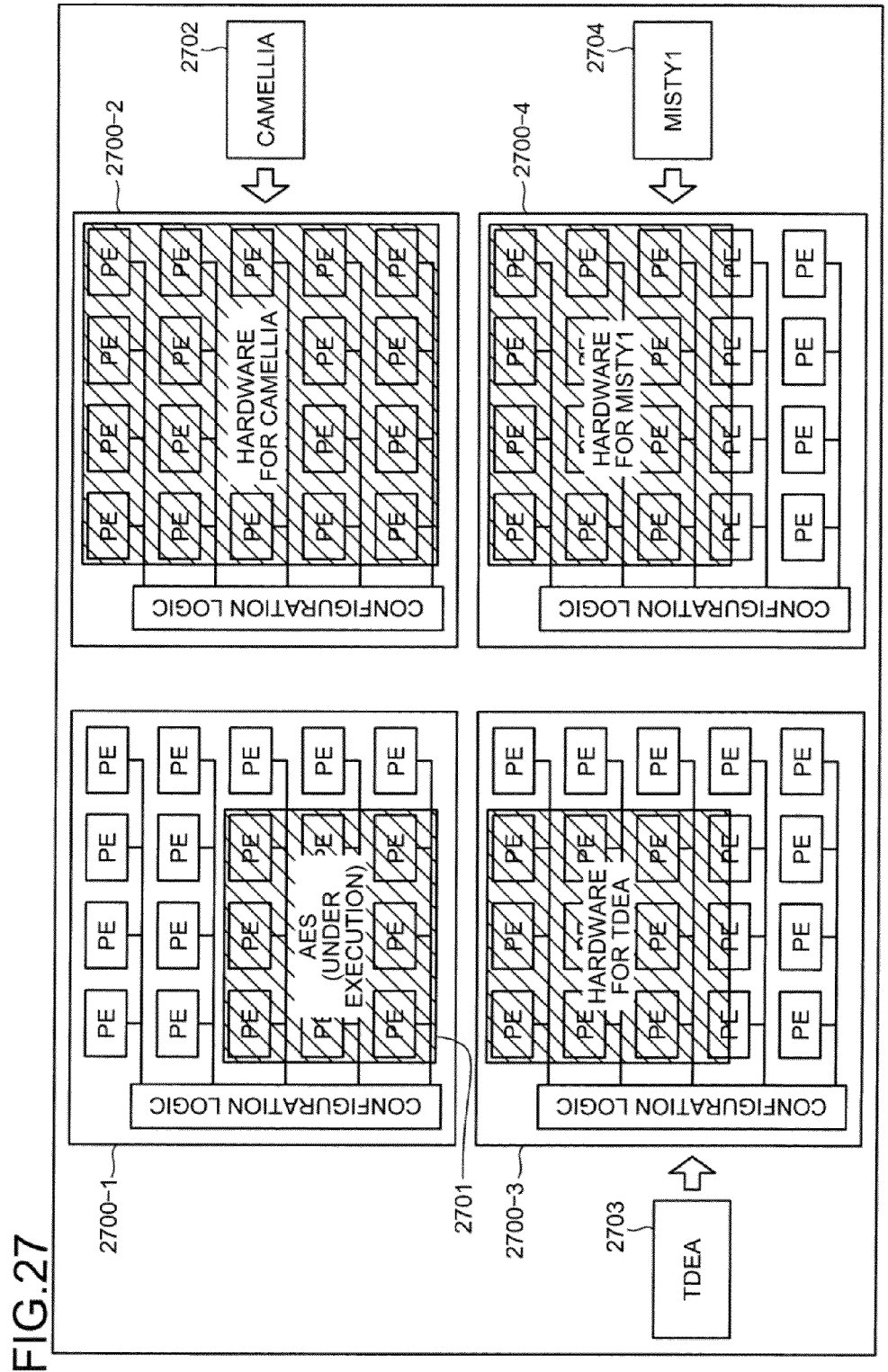
FIG. 27 is a diagram of a hardware rewriting process in plural dynamically reconfigurable circuits.
Figure 28:
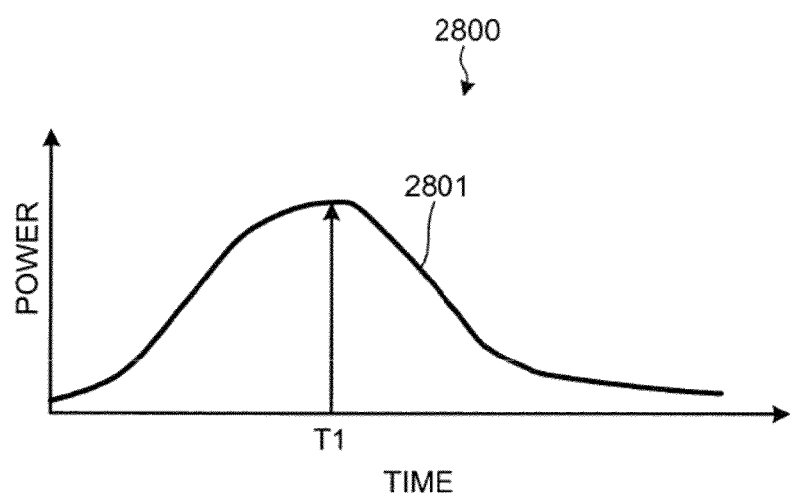
FIG. 28 is a graph of power consumption for the hardware rewriting process.

An exemplary process handling specific values by the dynamic reconfiguration support apparatus 2100 will be described as an example. The exemplary process described below is an example where an encryption scheme implemented on a portable apparatus is changed during execution. FIG. 25 is a diagram of exemplary calculation of the threshold curve corresponding to temperature variation. A graph 2500 is a graph of exemplary calculation of the threshold curve using the dynamic-reconfiguration support apparatus 300 according to the first example described with reference to FIG. 15.

The graph 2500 of FIG. 25 indicates exemplary correction of the number of PEs executed when the battery temperature varies from 40° C. to 0° C. after the number of PEs is determined using the dynamic-reconfiguration support apparatus 300 according to the first example as depicted in the graph 1500. When the battery temperature varies from 40° C. to 0° C., the power output also varies from 140 mw to 115 mw. Therefore, the number of PEs is decreased from four to three by a correction such that the power output during the next time interval between 1 and 2 becomes low, based on the temperature variation in the time interval between 0 and 1 (decrease to 0° C.). More specifically, to obtain the power ratio Wr=115/140=0.82, the dividing number N=4× 0.82=2.38, that is, the dividing number N is corrected to three.

As described, according to the second example, the number of PEs is decreased when the battery temperature increases, and the number of PEs is increased when the battery temperature decreases and thereby, the PEs are distributed and the rewriting is executed taking into account the power consumption relative to variations in the battery temperature. Therefore, even for a battery having a large difference in power output as a consequence of temperature characteristics, the peak of power consumption may be suppressed to a low level and the battery may be efficiently used.

The dynamic reconfiguration support method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be distributed through a network such as the Internet.

The dynamic reconfiguration support apparatus 100 described in the present embodiments can be implemented by an application specific integrated circuit (ASIC) such as a standard cell or a structured ASIC, or a programmable logic device (PLD) such as a field-programmable gate array (FPGA). Specifically, for example, functional units (the acquiring unit 101 to the threshold calculating unit 108 depicted in FIG. 1B, or the threshold curve calculating unit 410 and the task dividing number calculating unit 420 depicted in FIG. 4) of the dynamic reconfiguration support apparatus 100 are defined in hardware description language (HDL), which is logically synthesized and applied to the ASIC, the PLD, etc., thereby enabling manufacture of the dynamic reconfiguration support apparatus 100, 300.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein a dynamic-reconfiguration support program that causes a computer controlling a dynamically reconfigurable circuit comprising a plurality of rewritable processor elements to execute:

acquiring information concerning a first task that is under execution by the dynamically reconfigurable circuit, and from the dynamically reconfigurable circuit, information concerning remaining power of a battery that drives the dynamically reconfigurable circuit and power consumption information of the dynamically reconfigurable circuit;

reading an execution completion time of the first task, when the information concerning the first task is acquired at the acquiring, the execution completion time being read from a memory storing therein a sequence of tasks to be executed by the dynamically reconfigurable circuit, an execution completion time for each of the tasks, and scheduling information including a quantity of processor elements to be used for each of the tasks;

calculating, using the execution completion time for the first task read at the reading, a deadline time that is a time after which a second task is started by the dynamically reconfigurable circuit;

identifying, by referring to the quantity of processor elements to be used for each of the tasks included in the scheduling information, the quantity of the processor elements that are for the second task and are to be rewritten by the deadline time calculated at the calculating;

calculating an estimated value of remaining power of the battery up to the deadline time, using the information concerning the remaining power and the scheduling information acquired at the acquiring;

calculating a threshold value function expressing temporal variation of a threshold indicative of consumable power for the dynamically reconfigurable circuit by substituting, at each predetermined time period, the power consumption information for the estimated value calculated at the calculating of the estimated value;

calculating the quantity of the processor elements to be rewritten per unit time by dividing the quantity of the processor elements identified at the identifying, into a quantity rewritable at a power consumption equal to or less than a value of the threshold value function for each unit time; and causing the dynamically configurable circuit to execute, in the quantity per unit time calculated at the calculating of the quantity, rewriting of the processor elements that are for the second task and are to be rewritten by the deadline time.

2. The non-transitory computer-readable recording medium according to claim 1, wherein
the calculating of the estimated value of the remaining power includes calculating the estimated value of the remaining power using an arbitrary function, and
the calculating of the threshold value function includes calculating the threshold value function by substituting the power consumption information into the arbitrary function at each predetermined time period.

3. The non-transitory computer-readable recording medium according to claim 1, wherein
the calculating of the estimated value of the remaining power includes calculating the estimated value of the remaining power using an arbitrary attenuating function, and
the calculating of the threshold value function includes calculating the threshold value function by substituting the power consumption information into the arbitrary attenuating function at each predetermined time period.

4. The non-transitory computer-readable recording medium according to claim 1, wherein
the calculating of the threshold value function includes determining a function expressing the estimated value of the remaining power as the value of the threshold value function, when a power value indicated by the information concerning the remaining power of the battery at the predetermined time is higher than the estimated value of the remaining power.

5. The non-transitory computer-readable recording medium according to claim 1, the dynamic-reconfiguration support program further causing the computer to execute:
calculating an estimated temperature variation of the battery; and
correcting, using the estimated temperature variation calculated at the calculating of the estimated temperature variation, the quantity of processor elements calculated at the calculating of the quantity of the processor elements to be rewritten per unit time, wherein
the acquiring includes
acquiring temperature information of the battery, the calculating of the estimated temperature variation includes acquiring a variation amount indicated by the temperature information of the battery acquired at the acquiring, the variation amount being an amount of variation at each predetermined time period, and
calculating an estimated temperature of the battery during a subsequent predetermined time period by making a temperature indicated by the temperature information of the battery be proportional to the variation amount, and
the correcting includes correcting the quantity of the processor elements calculated at the calculating the quantity of the processor elements to be rewritten per unit time, based on a result of comparison of power output by the battery according to the estimated temperature variation calculated at the calculating the estimated temperature variation and the value of the threshold value function.

6. The non-transitory computer-readable recording medium according to claim 5, wherein the correcting includes
increasing the quantity of the processor elements calculated at the calculating of the quantity of the processor elements to be rewritten per unit time, when power output by the battery is high based on a ratio, and
decreasing the quantity of the processor elements calculated at the calculating of the quantity of the processor elements to be rewritten per unit time, when the power output by the battery is low based on the ratio.

7. A dynamic-reconfiguration support apparatus that controls a dynamically reconfigurable circuit comprising a plurality of rewritable processor elements, the dynamic-reconfiguration support apparatus comprising:
an acquiring unit that acquires information concerning a first task that is under execution by the dynamically reconfigurable circuit, and from the dynamically reconfigurable circuit, information concerning remaining power of a battery that drives the dynamically reconfigurable circuit and power consumption information of the dynamically reconfigurable circuit;
a reading unit that reads an execution completion time of the first task, when the information concerning the first task is acquired by the acquiring unit, the execution completion time being read from a memory storing therein a sequence of tasks to be executed by the dynamically reconfigurable circuit, an execution completion time for each of the tasks, and scheduling information including a quantity of processor elements to be used for each of the tasks;
a first calculating unit that, using the execution completion time for the first task read by the reading unit, calculates a deadline time that is a time after which a second task is started by the dynamically reconfigurable circuit;
an identifying unit that, by referring to the quantity of processor elements to be used for each of the tasks included in the scheduling information, identifies the quantity of the processor elements that are for the second task and are to be rewritten by the deadline time calculated by the first calculating unit;
a second calculating unit that calculates an estimated value of remaining power of the battery up to the deadline time, using the information concerning the remaining power and the scheduling information acquired by the acquiring unit;
a third calculating unit that calculates a threshold value function expressing temporal variation of a threshold function indicative of consumable power for the dynamically reconfigurable circuit by substituting, at each predetermined time period, the power consumption information for the estimated value calculated by the second calculating unit;
a fourth calculating unit that calculates the quantity of the processor elements to be rewritten per unit time by dividing the quantity of the processor elements identified by the identifying unit, into a quantity rewritable at a power consumption equal to or less than a value of the threshold value function for each unit time; and
an executing unit that causes the dynamically configurable circuit to execute, in the quantity per unit time calculated by the fourth calculating unit, rewriting of the processor elements that are for the second task and are to be rewritten by the deadline time.

8. A dynamic-reconfiguration support method of controlling a dynamically reconfigurable circuit comprising a plurality of rewritable processor elements, the dynamic-reconfiguration support method comprising:
acquiring information concerning a first task that is under execution by the dynamically reconfigurable circuit, and from the dynamically reconfigurable circuit, information concerning remaining power of a battery that drives the dynamically reconfigurable circuit and power consumption information of the dynamically reconfigurable circuit;

reading an execution completion time of the first task, when the information concerning the first task is acquired at the acquiring, the execution completion time being read from a memory storing therein a sequence of tasks to be executed by the dynamically reconfigurable circuit, an execution completion time for each of the tasks, and scheduling information including a quantity of processor elements to be used for each of the tasks;

calculating, using the execution completion time for the first task read at the reading, a deadline time that is a time after which a second task is started by the dynamically reconfigurable circuit;

identifying, by referring to the quantity of processor elements to be used for each of the tasks included in the scheduling information, the quantity of the processor elements that are for the second task and are to be rewritten by the deadline time calculated at the calculating;

calculating an estimated value of remaining power of the battery up to the deadline time, using the information concerning the remaining power and the scheduling information acquired at the acquiring;

calculating a threshold value function expressing temporal variation of a threshold indicative of consumable power for the dynamically reconfigurable circuit by substituting, at each predetermined time period, the power consumption information for the estimated value calculated at the calculating of the estimated value;

calculating the quantity of the processor elements to be rewritten per unit time by dividing the quantity of the processor elements identified at the identifying, into a quantity rewritable at a power consumption equal to or less than a value of the threshold value function for each unit time; and causing the dynamically configurable circuit to execute, in the quantity per unit time calculated at the calculating of the quantity, rewriting of the processor elements that are for the second task and are to be rewritten by the deadline time.

* * * * *